United States Patent
Vörös et al.

(10) Patent No.: US 12,010,129 B2
(45) Date of Patent: Jun. 11, 2024

(54) METHODS AND APPARATUS FOR USING MACHINE LEARNING TO CLASSIFY MALICIOUS INFRASTRUCTURE

(71) Applicant: Sophos Limited, Abingdon (GB)

(72) Inventors: Tamás Vörös, Budapest (HU); Richard Harang, Alexandria, VA (US); Joshua Daniel Saxe, Wichita, KS (US)

(73) Assignee: Sophos Limited, Abingdon (GB)

( * ) Notice: Subject to any disclaimer, the term of this patent is extended or adjusted under 35 U.S.C. 154(b) by 314 days.

(21) Appl. No.: 17/239,128

(22) Filed: Apr. 23, 2021

(65) Prior Publication Data

US 2022/0353284 A1 Nov. 3, 2022

(51) Int. Cl.
*H04L 29/06* (2006.01)
*G06N 3/045* (2023.01)
*H04L 9/40* (2022.01)

(52) U.S. Cl.
CPC ......... *H04L 63/1425* (2013.01); *G06N 3/045* (2023.01); *H04L 63/0236* (2013.01); *H04L 63/1416* (2013.01); *H04L 63/20* (2013.01)

(58) Field of Classification Search
CPC ............ H04L 63/1425; H04L 63/0236; H04L 63/1416; H04L 63/20; H04L 63/14; G06N 3/045; G06N 20/00
See application file for complete search history.

(56) References Cited

U.S. PATENT DOCUMENTS

| | | |
|---|---|---|
| 7,069,589 B2 | 6/2006 | Schmall et al. |
| 7,204,152 B2 | 4/2007 | Woodward et al. |
| 7,219,148 B2 | 5/2007 | Rounthwaite et al. |
| 7,545,986 B2 | 6/2009 | Bachmann |
| 7,558,832 B2 | 7/2009 | Rounthwaite et al. |
| 7,711,663 B2 | 5/2010 | Weng |
| 7,769,772 B2 | 8/2010 | Weyl et al. |
| 7,934,103 B2 | 4/2011 | Kidron |

(Continued)

FOREIGN PATENT DOCUMENTS

| | | |
|---|---|---|
| CA | 2799691 C | 9/2014 |
| JP | 2012027710 A | 2/2012 |

(Continued)

OTHER PUBLICATIONS

U.S. Appl. No. 17/239,128, InnovationQ Plus (filed 2023).*

(Continued)

*Primary Examiner* — Samson B Lemma
*Assistant Examiner* — Richard W Cruz-Franqui
(74) *Attorney, Agent, or Firm* — COOLEY LLP

(57) ABSTRACT

Embodiments disclosed include methods and apparatus for detecting a reputation of infrastructure associated with potentially malicious content. In some embodiments, an apparatus includes a memory and a processor. The processor is configured to identify an Internet Protocol (IP) address associated with potentially malicious content and define each row of a matrix by applying a different subnet mask from a plurality of subnet masks to a binary representation of the IP address to define that row of the matrix. The processor is further configured to provide the matrix as an input to a machine learning model, and receive, from the machine learning model, a score associated with a maliciousness of the IP address.

17 Claims, 14 Drawing Sheets

(5 of 14 Drawing Sheet(s) Filed in Color)

(56) References Cited

U.S. PATENT DOCUMENTS

| | | |
|---|---|---|
| 8,458,794 B1 | 6/2013 | Sallam |
| 8,635,700 B2 | 1/2014 | Richard et al. |
| 8,709,924 B2* | 4/2014 | Hanawa ............... C23C 16/505 |
| | | 438/510 |
| 9,189,730 B1 | 11/2015 | Coenen et al. |
| 9,404,833 B2 | 8/2016 | Stadlbauer et al. |
| 9,465,940 B1* | 10/2016 | Wojnowicz ........... G06F 21/562 |
| 9,514,391 B2 | 12/2016 | Perronnin et al. |
| 9,531,742 B2 | 12/2016 | Kohout et al. |
| 9,672,358 B1 | 6/2017 | Long et al. |
| 9,680,868 B2* | 6/2017 | Bailey .................. H04L 63/1408 |
| 9,690,938 B1 | 6/2017 | Saxe et al. |
| 9,721,097 B1 | 8/2017 | Davis et al. |
| 9,792,492 B2 | 10/2017 | Soldevila et al. |
| 9,807,113 B2 | 10/2017 | Yang et al. |
| 9,864,956 B1 | 1/2018 | Sai |
| 10,015,150 B2 | 7/2018 | Basin |
| 10,193,902 B1 | 1/2019 | Caspi |
| 10,521,587 B1 | 12/2019 | Agranonik et al. |
| 10,599,844 B2* | 3/2020 | Schmidtler ........... G06F 21/562 |
| 10,635,813 B2 | 4/2020 | Saxe et al. |
| 10,742,591 B2* | 8/2020 | Nguyen ............... H04L 61/4511 |
| 10,834,128 B1* | 11/2020 | Rajagopalan ......... H04L 51/212 |
| 10,956,477 B1 | 3/2021 | Fang et al. |
| 11,003,774 B2 | 5/2021 | Saxe et al. |
| 11,063,881 B1* | 7/2021 | Vijayasuganthan .. H04L 47/748 |
| 11,069,082 B1* | 7/2021 | Ebrahimi Afrouzi .. H04N 23/56 |
| 11,270,205 B2 | 3/2022 | Harang |
| 11,321,607 B2* | 5/2022 | Shah ...................... G06N 3/063 |
| 11,409,869 B2 | 8/2022 | Schmidtler et al. |
| 11,574,052 B2* | 2/2023 | Harang .................. G06F 18/21 |
| 11,609,991 B2* | 3/2023 | Saxe ...................... G06N 3/084 |
| 11,822,374 B2* | 11/2023 | Saxe ....................... G06N 3/04 |
| 2006/0013475 A1 | 1/2006 | Philomin et al. |
| 2008/0025208 A1* | 1/2008 | Chan ...................... H04L 12/42 |
| | | 370/258 |
| 2009/0003264 A1* | 1/2009 | Sastry ..................... H04W 8/12 |
| | | 370/328 |
| 2009/0122718 A1* | 5/2009 | Klessig ............... H04L 12/2854 |
| | | 370/254 |
| 2009/0254992 A1* | 10/2009 | Schultz ................. G06F 21/562 |
| | | 726/24 |
| 2009/0300765 A1 | 12/2009 | Moskovitch et al. |
| 2013/0067579 A1 | 3/2013 | Beveridge et al. |
| 2014/0090061 A1 | 3/2014 | Avasarala et al. |
| 2014/0143869 A1 | 5/2014 | Pereira et al. |
| 2015/0046850 A1 | 2/2015 | Kurabayashi et al. |
| 2015/0067853 A1 | 3/2015 | Amrutkar et al. |
| 2015/0213376 A1* | 7/2015 | Ideses .................... G06N 20/00 |
| | | 706/12 |
| 2015/0363294 A1 | 12/2015 | Carback, III et al. |
| 2016/0065597 A1* | 3/2016 | Nguyen ............... H04L 63/1441 |
| | | 726/22 |
| 2016/0217368 A1 | 7/2016 | Ioffe et al. |
| 2016/0218933 A1* | 7/2016 | Porras ................... H04L 41/147 |
| 2016/0253500 A1 | 9/2016 | Alme et al. |
| 2017/0046616 A1 | 2/2017 | Socher et al. |
| 2017/0078317 A1 | 3/2017 | Gertner et al. |
| 2017/0092264 A1* | 3/2017 | Hakkani-Tur .......... G10L 15/16 |
| 2017/0109615 A1* | 4/2017 | Yatziv ................. G06F 18/24323 |
| 2017/0212829 A1 | 7/2017 | Bales et al. |
| 2017/0351948 A1* | 12/2017 | Lee ......................... G06N 3/04 |
| 2017/0372071 A1* | 12/2017 | Saxe ....................... G06N 3/084 |
| 2018/0004803 A1* | 1/2018 | Hao ........................ G16H 70/20 |
| 2018/0053084 A1* | 2/2018 | Li .......................... G06N 3/045 |
| 2018/0060580 A1 | 3/2018 | Zhao et al. |
| 2018/0101682 A1 | 4/2018 | Krukov et al. |
| 2018/0121802 A1 | 5/2018 | Ruckauer et al. |
| 2018/0129786 A1 | 5/2018 | Khine |
| 2018/0137642 A1 | 5/2018 | Malisiewicz et al. |
| 2018/0144242 A1* | 5/2018 | Simard ................. G06N 3/045 |
| 2018/0152471 A1 | 5/2018 | Jakobsson |
| 2018/0211041 A1 | 7/2018 | Davis |
| 2018/0285740 A1* | 10/2018 | Smyth .................... G06N 3/084 |
| 2018/0285773 A1* | 10/2018 | Hsiao et al. |
| 2018/0288086 A1* | 10/2018 | Amiri ..................... G06N 3/08 |
| 2018/0293381 A1 | 10/2018 | Tseng et al. |
| 2019/0065744 A1 | 2/2019 | Gaustad |
| 2019/0095805 A1 | 3/2019 | Tristan |
| 2019/0108338 A1 | 4/2019 | Saxe et al. |
| 2019/0132355 A1 | 5/2019 | Egbert et al. |
| 2019/0205402 A1* | 7/2019 | Sernau ................... G06Q 50/01 |
| 2019/0236273 A1 | 8/2019 | Saxe et al. |
| 2019/0236490 A1 | 8/2019 | Harang et al. |
| 2019/0258807 A1 | 8/2019 | DiMaggio et al. |
| 2019/0266492 A1 | 8/2019 | Harang et al. |
| 2019/0295114 A1* | 9/2019 | Pavletic ................. G06F 18/214 |
| 2019/0347287 A1 | 11/2019 | Crossno et al. |
| 2019/0378050 A1* | 12/2019 | Edkin ..................... G06N 20/20 |
| 2019/0387005 A1* | 12/2019 | Zawoad ................ H04L 61/4511 |
| 2020/0097817 A1* | 3/2020 | Harris .................... G06N 3/04 |
| 2020/0104636 A1 | 4/2020 | Halevi et al. |
| 2020/0117975 A1 | 4/2020 | Harang et al. |
| 2020/0228998 A1* | 7/2020 | Bai ....................... H04L 5/0048 |
| 2020/0250309 A1 | 8/2020 | Harang et al. |
| 2020/0257799 A1 | 8/2020 | Saxe et al. |
| 2020/0311586 A1* | 10/2020 | Sandstrom .............. G06N 7/01 |
| 2020/0342337 A1* | 10/2020 | Choudhary ............ G06N 3/084 |
| 2021/0014247 A1 | 1/2021 | Wosotowsky et al. |
| 2021/0073377 A1* | 3/2021 | Coull ..................... G06N 3/045 |
| 2021/0073661 A1* | 3/2021 | Matlick ............... H04L 61/3025 |
| 2021/0092140 A1* | 3/2021 | Kazerounian ....... H04L 63/1425 |
| 2021/0093973 A1* | 4/2021 | Edridge ................. A63F 13/424 |
| 2021/0120013 A1* | 4/2021 | Hines ..................... G06N 3/045 |
| 2021/0168165 A1* | 6/2021 | Alsaeed ................. G06N 20/00 |
| 2021/0211450 A1* | 7/2021 | Aleidan ............... H04L 63/1433 |
| 2021/0241175 A1 | 8/2021 | Harang et al. |
| 2021/0287354 A1* | 9/2021 | Kumar ...................... G06T 7/10 |
| 2021/0326440 A1 | 10/2021 | Saxe et al. |
| 2021/0328801 A1* | 10/2021 | Sly ........................ G06V 40/168 |
| 2021/0328969 A1* | 10/2021 | Gaddam ................. G06F 21/44 |
| 2021/0397956 A1* | 12/2021 | Rasamsetti .............. G06N 3/08 |
| 2022/0036194 A1* | 2/2022 | Sundaresan ............ G06N 3/063 |
| 2022/0083662 A1* | 3/2022 | Grobman ............... G06N 20/00 |
| 2022/0083900 A1* | 3/2022 | Khanna .................. G06F 17/18 |
| 2022/0124543 A1* | 4/2022 | Orhan ................... G06N 3/006 |
| 2022/0284283 A1* | 9/2022 | Yin ......................... G06N 3/04 |
| 2022/0353284 A1* | 11/2022 | Vörös ..................... H04L 63/20 |
| 2023/0089380 A1* | 3/2023 | Jiang .................... G06V 10/454 |
| | | 706/27 |
| 2023/0229772 A1* | 7/2023 | Saxe ....................... G06N 5/04 |
| | | 26/24 |

FOREIGN PATENT DOCUMENTS

| | | |
|---|---|---|
| WO | WO 2007/117636 A2 | 10/2007 |
| WO | WO-2019071095 A1 | 4/2019 |
| WO | WO 2019/150079 A1 | 8/2019 |
| WO | WO-2019145912 A1 | 8/2019 |
| WO | WO 2019/166989 A1 | 9/2019 |
| WO | WO-2020030913 A1 | 2/2020 |
| WO | WO-2020157479 A1 | 8/2020 |
| WO | WO-2022223940 A1 | 10/2022 |

OTHER PUBLICATIONS

D. Chiba et al., Detecting Malicious Websites by Learning IP Address Features, IEEE-IPSJ 12th International Symposium on Applications and the Internet (Year: 2012).*

NPL History Search (Year: 2023).*

U.S. Appl. No. 15/884,542, Office Action dated Apr. 5, 2022, 32 pages.

U.S. Appl. No. 16/158,844, Office Action dated May 24, 2022, 25 pages.

U.S. Appl. No. 16/853,803, Office Action dated May 2, 2022, 9 pages.

Xu, K., et al., "DeepRefiner: Multi-layer Android Malware Detection System Applying Deep Neural Networks," IEEE European Symposium on Security and Privacy, 2018, 15 pages.

(56) References Cited

OTHER PUBLICATIONS

Chiba, Daiki et al., "Detecting Malicious Websites by Learning IP Address Features", 2012 IEEE/IPSJ 12th International Symposium on Applications and the Internet, Jul. 16, 2012 (Jul. 16, 2012), pp. 29-39.

International Search Report and Written Opinion for International Application No. PCT/GB2022/050681, dated Jun. 20, 2022, 14 pages.

U.S. Appl. No. 15/727,035, Notice of Allowance dated Dec. 27, 2019, 7 pages.

U.S. Appl. No. 16/257,749, Office Action dated Aug. 11, 2020, 14 pages.

U.S. Appl. No. 16/257,749, Notice of Allowance dated Mar. 1, 2021, 10 pages.

U.S. Appl. No. 15/884,542, Office Action dated Mar. 4, 2021, 53 pages.

U.S. Appl. No. 15/907,807, Office Action dated Apr. 27, 2021, 18 pages.

Augasta and Kathirvalavakumar, "Pruning algorithms of neural networks—a comparative study", Cent. Eur. J. Comp. Sci. (2013); 3(3): 105-115.

Ba, et al., "Layer Normalization." [Online] Retrieved from the Internet https://arxiv.org/pdf/1607.06450.pdf>, Submitted on Jul. 21, 2016, 14 pages.

Cheplyaka, R., "Rank vs Order in R", Oct. 30, 2017 https://ro-che.info/articles/2016-03-19-rank-vs-order-r (Year: 2017), 4 pages.

Chiba, et al., "Analyzing Spatial Structure of IP Addresses for Detecting Malicious Websites", Journal of Information Processing (Jul. 2013); 21(3): 539-550.

Deo, A., et al., "Prescience: Probabilistic Guidance on the Retraining Conundrum for Malware Detection", AISec '16 Proceedings of the 2016 ACM Workshop on Artificial Intelligence and Security, Oct. 28, 2016, Vienna, Austria, Retrieved from the Internet http://delivery.acm.org/10.1145/3000000/2996769/p71-deo.pdf?ip=69.125.105.131&id=2996769&acc=OPENTOC&key=4D4702B0C3E38B35%2E4D4702B0C3E38B35%2E4D4702B0C3E38B35%2E9F04A3A78F7D3B8D&_acm_=1573741004_98b035a9ad71ffc3e5289851a65d39e7, 12 pages.

Engelbrecht, Andries P., "A New Pruning Heuristic Based on Variance Analysis of Sensitivity Information", IEEE Transactions on Neural Networks (Nov. 2001); vol. 12, No. 6, pp. 1386-1399.

Harang, R. "Estimating weight sharing in multi-task networks via approximate Fisher information," SOPHOS, [online] Retrieved from the Internet https://www.camlis.org/s/harang_CAMLIS17.pdf> Oct. 28, 2017, 31 pages.

Harang and Ducau, "Measuring the speed of the Red Queen's Race", BlackHat USA 2018, Aug. 4-9, 2018, Las Vegas, NV, USA, 18 pages.

Harang and Ducau, "Measuring the speed of the Red Queen's Race", SOPHOS Presentation (2018), Retrieved from the Internet https://i.blackhat.com/us-18/Wed-August-8/us-18-Harang-Measuring-the-Speed-of-the-Red-Queens-Race.pdf, 48 pages.

Harang and Rudd, "Principled Uncertainty Estimation for Deep Neural Networks". [Online] arXiv:1810.12278 [cs.LG], [v1] Oct. 29, 2018, Retrieved from the Internet https://arxiv.org/abs/1810.12278v1.pdf, 8 pages.

Huang, L. et al., "Orthogonal Weight Normalization: Solution to Optimization over Multiple Dependent Stiefel Manifolds in Deep Neural Networks," [Online], Retrieved from the Internet: <URL: https://arxiv.org/pdf/1709.06079.pdf>, Nov. 21, 2017, 20 pages.

Tseng, Huihsin et al., U.S. Appl. No. 62/483,102, filed Apr. 7, 2017, 19 pages.

International Preliminary Report on Patentability for International Patent Application No. PCT/US2018/054558, dated Apr. 8, 2020, 5 pages.

International Search Report and Written Opinion for International Patent Application No. PCT/US2018/054558, dated Dec. 10, 2018, 6 pages.

International Search Report and Written Opinion for International Patent Application No. PCT/GB2019/050199, dated Mar. 29, 2019, 15 pages.

International Search Report and Written Opinion for International Patent Application No. PCT/IB2019/050642, dated Apr. 12, 2019, 17 pages.

International Search Report and Written Opinion for International Patent Application No. PCT/IB2019/051629, dated Jun. 17, 2019, 14 pages.

International Search Report and Written Opinion for International Patent Application No. PCT/GB2019/052222, dated Nov. 12, 2019, 17 pages.

International Search Report and Written Opinion for International Patent Application No. PCT/GB2020/050188, dated Mar. 31, 2020, 12 pages.

Ioffe and Szegedy, "Batch Normalization: Accelerating Deep Network Training by Reducing Internal Covariate Shift." [Online] Retrieved from the Internet https://arxiv.org/pdf/1502.03167v3.pdf>, Submitted on Feb. 11, 2015 (v1), last revised Mar. 2, 2015 (this version, v3), 11 pages.

Kang, et al., "Malware Classification Method via Binary Content Comparison", RACS'12, Oct. 23-26, 2012, San Antonio, TX, USA (2012); 6 pages, https://dl.acm.org/doi/pdf/10.1145/2401603.2401672.

Kardan and Stanley, "Fitted Learning: Models with Awareness of their Limits". [Online] arXiv:1609.02226v4 [cs.AI] Jul. 9, 2018, Retrieved from the Internet https://arxiv.org/pdf/1609.02226.pdf, 19 pages.

Kirkpatrick, J. et al., "Overcoming catastrophic forgetting in neural networks," PNAS (2017); 114 (13): 3521-3526.

Kim, Hae-Jung, "Image-Based Malware Classification Using Convolutional Neural Network", In: Park J., Loia V., Yi G., Sung Y. (eds) Advances in Computer Science and Ubiquitous Computing. Lecture Notes in Electrical Engineering (2018); vol. 474, pp. 1352-1357.

Liao and Carneiro, "On the Importance of Normalisation Layers in Deep Learning with Piecewise Linear Activation Units." [Online] Retrieved from the Internet https://arxiv.org/pdf/1508.00330.pdf>, Submitted on Aug. 3, 2015 (v1), last revised Nov. 1, 2015 (this version, v2)), 7 pages.

Liao, et al., "Streaming Normalization: Towards Simpler and More Biologically-plausible Normalizations for Online and Recurrent Learning." Center for Brains, Minds & Machines, Memo No. 057, [Online] Retrieved from the Internet https://arxiv.org/pdf/1610.06160.pdf>, Oct. 19, 2016, 21 pages.

Lison and Mavroeidis, "Neural Reputation Models learned from Passive DNS Data", "Neural reputation models learned from passive DNS data," 2017 IEEE International Conference on Big Data (Big Data), Boston, MA (Dec. 11-14, 2017); pp. 3662-3671, doi: 10.1109/BigData.2017.8258361.

Lundberg, S. M. et al., "A Unified Approach to Interpreting Model Predictions," 31st Conference on Neural Information Processing Systems (NIPS 2017), Long Beach, CA, USA, 10 pages.

Montavon, G. et al., "Methods for Interpreting and Understanding Deep Neural Networks," [Online], Retrieved from the Internet: <URL: https://arxiv.org/pdf/1706.07979.pdf>, Jun. 24, 2017, 14 pages.

Narayanan, et al., "A multi-view context-aware approach to Android malware detection and malicious code localization." Empir Software Eng (2018); 23: 1222-1274. Epub Aug. 30, 2017.

Pascanu, R. et al., "Revisiting natural gradient for deep networks," [Online], Retrieved from the Internet: <URL: https:/arxiv.org/pdf/1301.3584v7.pdf>, Feb. 17, 2014, 18 pages.

Pennington and Worah, et al., "The Spectrum of the Fisher Information Matrix of a Single-Hidden-Layer Neural Network", 32nd Conference on Neural Information Processing Systems (NeurIPS 2018), Montréal, Canada, pp. 1-16.

Ribeiro, M. T. et al., "Model-Agnostic Interpretability of Machine Learning," [Online], Retrieved from the Internet: <URL: https://arxiv.org/pdf/1606.05386.pdf>, Jun. 16, 2016, 5 pages.

(56) References Cited

OTHER PUBLICATIONS

Ribeiro, M. T. et al., "'Why Should I Trust You?' Explaining the Predictions of Any Classifier," [Online], Retrieved from the Internet: <URL: https://arxiv.org/pdf/1602.04938v3.pdf>, Aug. 9, 2016, 10 pages.
Ribeiro, M. T., "LIME—Local Interpretable Model-Agnostic Explanations," [Online Blog], Retrieved from the Internet: <URL: https://homes.cs.washington.edu/~marcotcr/blog/lime/>, Apr. 2, 2016, 7 pages.
Rudd, E.R., et al., "MOON: A Mixed Objective Optimization Network for the Recognition of Facial Attributes." [Online], Retrieved from the Internet: <URL:https://arxiv.org/abs/1603.07027>, arXiv:1603.07027 [cs.CV], Mar. 22, 2016, 17 pages.
Rudd, et al., "MEADE: Towards a Malicious Email Attachment Detection Engine", 2018 IEEE International Symposium on Technologies for Homeland Security (HST), IEEE, Oct. 23, 2018, pp. 1-7.
Rudd, et al., "The Extreme Value Machine". [Online] arXiv:1506.06112v4 [cs.LG] May 21, 2017, Retrieved from the Internet https://arxiv.org/abs/1506.06112.pdf, 12 pages.
Salimans, T. et al., "Weight Normalization: A Simple Reparameterization to Accelerate Training of Deep Neural Networks," [Online], Retrieved from the Internet: <URL: https://arxiv.org/pdf/1602.07868.pdf>, Jun. 4, 2016, 11 pages.
Sanghani, et al., "Personalized spam filtering using incremental training of support vector machine". 2016 International Conference on Computing, Analytics and Security Trends (CAST), IEEE Dec. 19, 2016, pp. 323-328, 6 pages.
Santos and Torres, "Macro Malware Detection using Machine Learning Techniques—A New Approach." In Proceedings of the 3rd International Conference on Information Systems Security and Privacy (ICISSP 2017, Scitepress—Science and Technology Publications, Lda), pp. 295-302, ISBN: 978-989-758-209-7, ElevenPaths, Telefonica Digital Cyber Security Unit, Madrid, Spain. [Online], Retrieved from the Internet on Nov. 19, 2018: http://www.scitepress.org/Papers/2017/61322, 8 pages.
Saxe and Berlin, "Deep Neural Network Based Malware Detection Using Two Dimensional Binary Program Features," IEEE 2015,10th International Conference on Malicious and Unwanted Software: "Know Your Enemy" (Malware), 2015, pp. 11-20.
Saxe and Berlin, "eXpose: A Character-Level Convolutional Neural Network with Embeddings for Detecting Malicious URLs, File Paths and Registry Keys." [Online], Retrieved from the Internet: <https://arxiv.org/abs/1702.08568>, arXiv:1702.08568v1 [cs.CR], Feb. 27, 2017, 18 pages.
Schultz, et al., "Data Mining Methods for Detection of New Malicious Executables", Proceedings of the 2001 IEEE Symposium on Security and Privacy (2001); Oakland, CA, May 14-16, 2001; [Proceedings of the IEEE Symposium on Security and Privacy], Los Alamitos, CA: IEEE Comp. Soc., US, May 14, 2001, pp. 38-49, 12 pages.
Sethi and Kantardzic, "Handling adversarial concept drift in streaming data". Expert Systems With Applications (May 1, 2018); 97: 18-40. Available online Dec. 11, 2017.
Shah, S., et al., "Virus Detection using Artificial Neural Networks; International Journal of Computer Applications", International Journal of Computer Applications (0975-8887) (Dec. 2013); vol. 84, No. 5, pp. 17-23.
Srivastava, et al., "Dropout: A Simple Way to Prevent Neural Networks from Overfitting." Journal of Machine Learning Research (2014); 15: 1929-1958. Submitted Nov. 2013; Published Jun. 2014, 30 pages.
Tahan, G., et al., "Mal:ID: Automatic Malware Detection Using Common Segment Analysis and Meta-Features." Journal of Machine Learning (2012); (Submitted Aug. 2011; Published Feb. 2012); 1: 1-48, 33 pages.
Theis, L. et al., "Faster gaze prediction with dense networks and Fisher pruning," [Online], Retrieved from the Internet: <URL: https://arxiv.org/pdf/1801.05787.pdf>, Jan. 17, 2018, 10 pages.
Tian, et al., "An automated classification system based on the strings of trojan and virus families." Malicious and Unwanted Software (Malware); 2009 4th International Conference, Piscataway, NJ, USA, Oct. 13, 2009, pp. 23-30, 8 pages.
Tolomei, G. et al., "Interpretable Predictions of Tree-based Ensembles via Actionable Feature Tweaking," [Online], Retrieved from the Internet: <URL: https://arxiv.org/pdf/1706.06691.pdf>, Jun. 20, 2017, 10 pages.
Tu, M. et al., "Ranking the parameters of deep neural networks using the Fisher information," 41st IEEE International Conference on Acoustics, Speech and Signal Processing, ICASSP 2016—Shanghai, China, Institute of Electrical and Electronics Engineers Inc., pp. 2647-2651 (2016).
Tu, M., et al., "Reducing the Model Order of Deep Neural Networks Using Information Theory", IEEE Computer Society (2016); 2016 IEEE Computer Society Annual Symposium on VLSI, pp. 93-98.
Velez and Clune, Identifying Core Functional Networks and Functional Modules within Artificial Neural Networks via Subsets Regression, GECCO '16, Proceedings of the Genetic and Evolutionary Computation Conference 2016, Jul. 20-24, 2016, pp. 181-188.
Wu, et al., "L1-Norm Batch Normalization for Efficient Training of Deep Neural Networks." [Online] Retrieved from the Internet https://arxiv.org/pdf/1802.09769.pdf>, Submitted on Feb. 27, 2018, 8 pages.
U.S. Appl. No. 15/884,542, Office Action dated Sep. 9, 2021, 44 pages.
U.S. Appl. No. 16/263,264, Office Action dated Feb. 22, 2022, 13 pages.
U.S. Appl. No. 15/884,542, Notice of Allowance dated Jul. 13, 2023, 13 pages.
U.S. Appl. No. 16/158,844, Notice of Allowance dated Nov. 1, 2023, 11 pages.
U.S. Appl. No. 16/158,844, Office Action dated Jun. 29, 2023, 35 pages.
U.S. Appl. No. 17/314,625, Corrected Notice of Allowability dated Oct. 24, 2023, 5 pages.
International Preliminary Report on Patentability for International Patent Application No. PCT/GB2022/050681, dated Nov. 2, 2023, 7 pages.
Buitinck, L., et al., "API design for machine learning software: experiences from the scikit-learn project", arXiv preprint (2013); 16 pages.
Dai, J., et al., "Efficient Virus Detection Using Dynamic Instruction Sequences", Journal of Computers (May 2009); 4(5): 405-414.
Devi, D., et al., "Detection of packed malware", SecurIT'12 (Aug. 17-19, 2012); p. 22.
Elovici, Y., et al., "Applying machine learning techniques for detection of malicious code in network traffic", KI 2007: Advances in Artificial Intelligence: 30th Annual German Conference on AI, KI 2007, Osnabrück, Germany (Sep. 10-13, 2007); Proceedings 30, Springer Berlin Heidelberg (2007); 44-50.
Henchiri, O., et al., "A feature selection and evaluation scheme for computer virus detection", Proceedings of the Sixth International Conference on Data Mining (ICDM'06), IEEE Computer Society (2006); 5 pages.
Joachims, T., "Making large-scale SVM learning practical LS-8 Report 24", Technical Report, University of Dortmund (1998); 18 pages.
Kecman, V., "Support vector machines-an introduction", StudFuzz, Springer-Verlag Berlin Heidelberg (2005); 177: 1-11.
Kolter, J. Z., et al., "Learning to detect and classify malicious executables in the wild", Journal of Machine Learning Research (2006); 7(12): 2721-2744.
Kolter, J. Z., et al., "Learning to detect malicious executables in the wild", Proceedings of the Tenth ACM SIGKDD International Conference on Knowledge Discovery and Data Mining (2004); 9 pages.
Menahem, E., et al., "Improving malware detection by applying multi-inducer ensemble", Computational Statistics & Data Analysis (2009); 53: 1483-1494.
Monnappa, K. A., "Introduction to Malware Analysis", Learning Malware Analysis: Explore the concepts, tools, and techniques to

(56) References Cited

OTHER PUBLICATIONS analyze and investigate Windows malware, Packt Publishing Ltd., Birmingham-Mumbai (2018); Chapter 1: pp. 7-10; Chapter 9: p. 362; 9 pages.

Mukkamala, S., et al., "Intrusion detection using an ensemble of intelligent paradigms", Journal of Network and Computer Applications (2005); 28(2): 167-182.

Russell, S. J., "Kernel Machines", Artificial Intelligence a Modern Approach, Pearson Education International (2010); Section 20(6): 749-751.

Sikorski, M., et al., "Practical malware analysis: the hands-on guide to dissecting malicious software", no starch press (2012); pp. 2-3; pp. 11-13; p. 384; 12 pages.

Souppaya, M., et al., "Guide to malware incident prevention and handling for desktops and laptops", NIST Special Publication 800-83 Revision 1 (2013); 47 pages.

Tahan, G., et al., "Mal:ID: Automatic Malware Detection Using Common Segment Analysis and Meta-Features." Journal of Machine Learning 13 (2012); (Submitted Aug. 2011; Revised Nov. 2011, Published Apr. 2012); pp. 949-979, https://www.jmlr.org/papers/volume13/tahan12a/tahan12a.pdf.

U.S. Appl. No. 15/727,035, Office Action dated Aug. 14, 2019, 11 pages.

U.S. Appl. No. 15/884,542, Advisory Action dated Dec. 6, 2022, 3 pages.

U.S. Appl. No. 15/884,542, Office Action dated Jan. 26, 2023, 32 pages.

U.S. Appl. No. 15/884,542, Office Action dated Sep. 21, 2022, 32 pages.

U.S. Appl. No. 15/907,807, Notice of Allowance dated Oct. 20, 2021, 5 pages.

U.S. Appl. No. 16/158,844, Advisory Action dated Jun. 6, 2023, 3 pages.

U.S. Appl. No. 16/158,844, Office Action dated Jan. 4, 2023, 32 pages.

U.S. Appl. No. 16/263,264, Corrected Notice of Allowability dated Jan. 5, 2023, 2 pages.

U.S. Appl. No. 16/263,264, Notice of Allowance dated Oct. 4, 2022, 9 pages.

U.S. Appl. No. 16/853,803, Notice of Allowance dated Nov. 30, 2022, 7 pages.

U.S. Appl. No. 17/314,625, Corrected Notice of Allowability dated Mar. 29, 2023, 2 pages.

U.S. Appl. No. 17/314,625, Notice of Allowance dated Mar. 7, 2023, 10 pages.

Wang, T., et al., "Detecting unknown malicious executables using portable executable headers", 2009 Fifth International Joint Conference on Inc, IMS and IDC. IEEE (2009); 1 page.

Wilding, Ed., "The authoritative international publication on computer virus prevention, recognition and removal", Virus Bulletin (Nov. 1990); 24 pages.

Ye, Y., et al., "SBMDS: an interpretable string based malware detection system using SVM ensemble with bagging", Journal in Computer Virology (2009); 5: 283-293.

Ye, Y., et al., "Hierarchical associative classifier (HAC) for malware detection from the large and imbalanced gray list", Journal of Intelligent Information Systems (2010); 35: 1-20.

\* cited by examiner

| ISP | Ratio of all IPs | Ratio of all malicious IPs | Maliciousness ratio |
|---|---|---|---|
| ISP A | 0.18 | 0.16 | 0.35 |
| ISP B | 0.04 | 0.08 | 0.81 |
| ISP C | 0.02 | 0.04 | 0.99 |
| ISP D | 0.03 | 0.03 | 0.39 |
| ISP E | 0.02 | 0.03 | 0.68 |
| ISP F | 0.13 | 0.03 | 0.07 |
| ISP G | 0.01 | 0.02 | 1.0 |
| ISP H | 0.01 | 0.02 | 0.77 |
| ISP I | 0.03 | 0.02 | 0.3 |
| ISP J | 0.02 | 0.02 | 0.38 |

FIG. 4A

| ISP | IP range | Maliciousness ratio |
|---|---|---|
| ISP C | PREFIX A/17 | 1.0 |
| ISP C | PREFIX B/17 | 0.99 |
| ISP C | PREFIX C/17 | 1.0 |
| ISP C | PREFIX D/17 | 1.0 |
| ISP C | PREFIX E/17 | 0.99 |
| ISP C | PREFIX F/24 | N/A |

FIG. 4B

| Representation | AUC | FPR | | | |
|---|---|---|---|---|---|
| | | 0.0001 | 0.001 | 0.01 | 0.1 |
| convolution | 0.898 | 0.013 | 0.153 | 0.371 | 0.728 |
| distilbert | 0.904 | 0.024 | 0.213 | 0.408 | 0.74 |
| embedding | 0.874 | 0.017 | 0.16 | 0.334 | 0.655 |
| quad onehot | 0.88 | 0.015 | 0.109 | 0.337 | 0.683 |
| octetext | 0.886 | 0.035 | 0.125 | 0.334 | 0.701 |

Web dataset

FIG. 8C

| Representation | AUC | FPR | | | |
|---|---|---|---|---|---|
| | | 0.0001 | 0.001 | 0.01 | 0.1 |
| convolution | 0.989 | 0.164 | 0.473 | 0.827 | 0.977 |
| distilbert | 0.989 | 0.123 | 0.47 | 0.846 | 0.975 |
| embedding | 0.983 | 0.063 | 0.334 | 0.753 | 0.961 |
| quad onehot | 0.987 | 0.104 | 0.413 | 0.79 | 0.971 |
| octetext | 0.988 | 0.088 | 0.389 | 0.806 | 0.977 |

Email dataset

FIG. 8D

|   | | FPR | | | |
|---|---|---|---|---|---|
| Model | AUC | 0.0001 | 0.001 | 0.01 | 0.1 |
| CNN | 0.947 | 0.062 | 0.209 | 0.531 | 0.853 |
| distilbert | 0.925 | 0.03 | 0.221 | 0.484 | 0.778 |

Web

FIG. 11C

|   | | FPR | | | |
|---|---|---|---|---|---|
| Model | AUC | 0.0001 | 0.001 | 0.01 | 0.1 |
| distilbert | 0.981 | 0.122 | 0.323 | 0.68 | 0.962 |
| CNN | 0.994 | 0.16 | 0.455 | 0.915 | 0.991 |

Spam

FIG. 11D

| Features missing percentage | 100 | 80 | 60 | 40 | 20 | 0 |
|---|---|---|---|---|---|---|
| AUC | 0.903 | 0.908 | 0.91 | 0.916 | 0.925 | 0.94 |

FIG. 11E

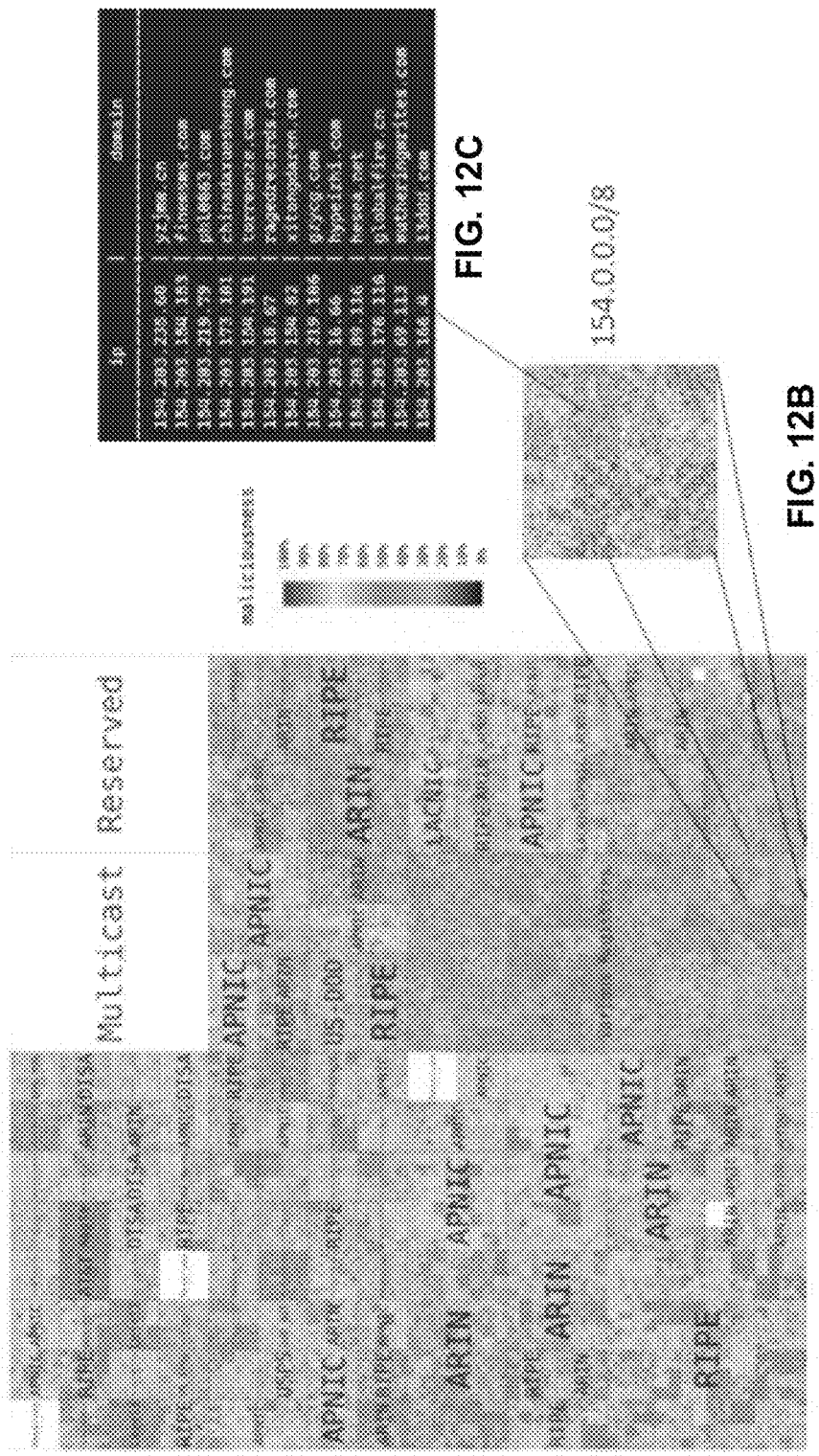

METHODS AND APPARATUS FOR USING MACHINE LEARNING TO CLASSIFY MALICIOUS INFRASTRUCTURE

BACKGROUND

The embodiments described herein relate to methods and apparatus for identifying and/or classifying potentially malicious infrastructure including Internet Protocol (IP) addresses by identifying infrastructure having similar reputation characteristics in a representational space using machine learning. More particularly, the embodiments described herein relate to methods and apparatus for using machine learning models to represent IP addresses in a representational space and using information based on the representation to identify IP addresses associated with malicious actors that may potentially carry out malicious activity.

Some known malicious artifacts can be embedded and distributed in several forms (e.g., text files, audio files, video files, data files, etc.) that are seemingly harmless in appearance but hard to detect and can be prone to cause severe damage or compromise of sensitive hardware, data, information, and/or the like. Malicious threats often involve communication via the Internet. Intercepting Internet communications and identifying malicious content associated with the communication, based on infrastructure associated with the communication, thus, provides an opportunity for defense against these types of attacks.

Some known systems can identify malicious attacks in communications associated with certain domains. Domains, however, can be switched on and off and redirected. A domain associated with malicious content at a first time may be associated with benign content at a second time. Thus, a need exists for improved apparatuses and methods for identification of malicious actors using information obtained from Internet communications.

SUMMARY

According to an aspect of the present disclosure, an apparatus including a memory and a processor is provided for determining a reputation of an infrastructure supporting Internet communications such as an Internet protocol (IP) address. The processor is configured to identify an IP address associated with potentially malicious content. The processor is further configured to define each row of a matrix by applying a different subnet mask from a set of subnet masks to a binary representation of the IP address to define that row of the matrix. The processor is further configured to provide the matrix as an input to a machine learning model, and receive, from the machine learning model, a score associated with a maliciousness of the IP address.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4A is a table listing the top ten Internet Service Providers (ISPs) in an example dataset, and their respective contributions to the malicious portion of content in the example dataset.

FIG. 4B is a table listing a particularly malicious ISP from the table in FIG. 3A with non-contiguous Internet Protocol (IP) address ranges, according to an example.

FIGS. 8C and 8D are tables indicating numerical results based on the plots shown in FIGS. 8A and 8B, respectively.

FIGS. 11C and 11D are tables indicating numerical results based on the plots shown in FIGS. 11A and 11B, respectively.

FIG. 11E is a table indicating IP address reputation detection results obtained using ML, models that account for missing values within a set of characteristics associated with IP addresses in a communication network infrastructure, as implemented by an RD device, according to an embodiment.

FIG. 12A is a schematic illustration of a visualization of maliciousness probabilities associated with IP addresses in an IP space, predicted by an ML model implemented by an RD device, according to an embodiment.

FIG. 12B shows a magnified view of a portion of the representation in FIG. 12A.

FIG. 12C shows a tabulated list of IP addresses mapped on the visualization of the IP space shown in FIG. 13B and their associated domain names.

DETAILED DESCRIPTION

Figure 1:
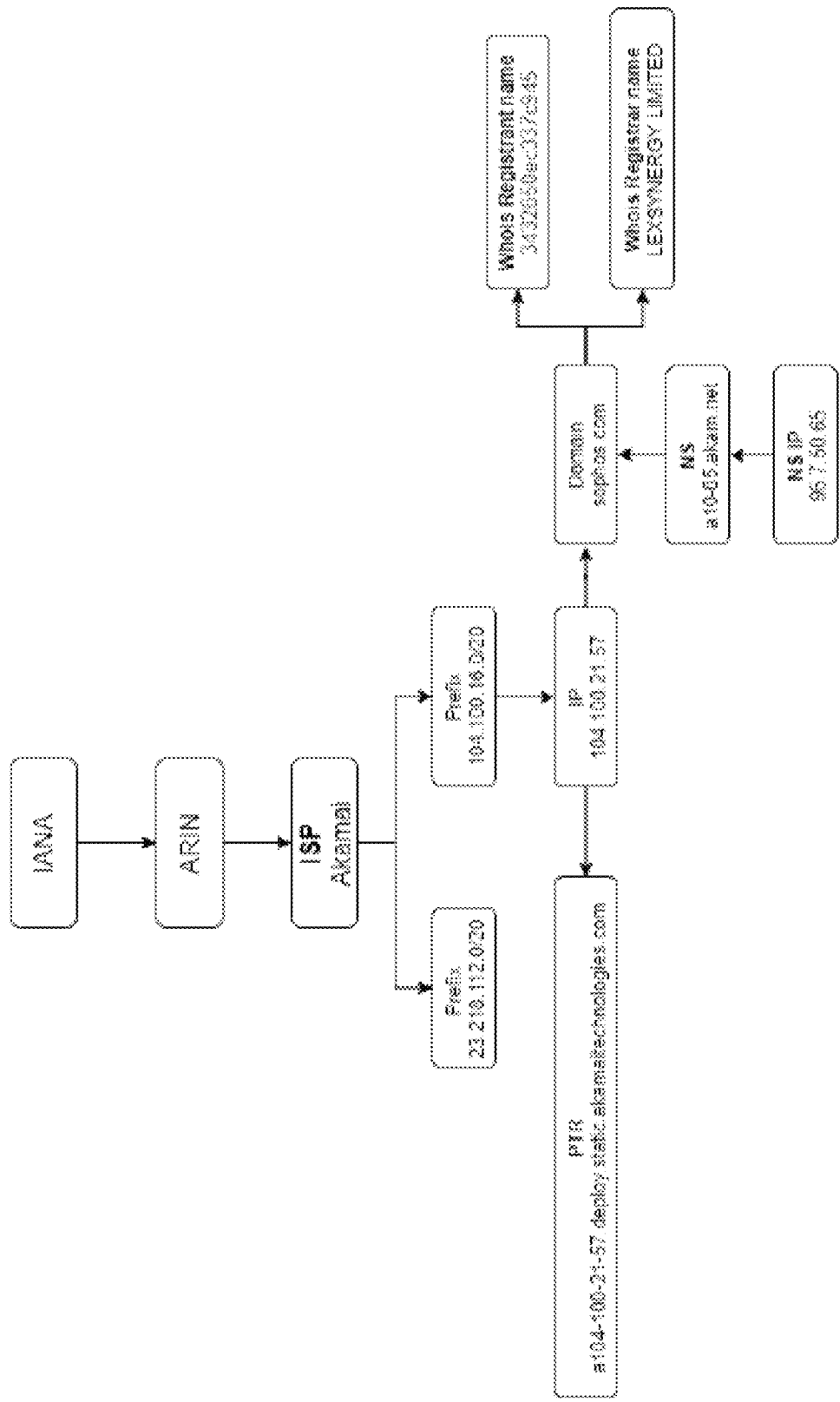
FIG. 1 is a schematic illustration of a hierarchical organization of infrastructure supporting a communication network, according to an example.

In some embodiments, an apparatus includes a memory and a processor operatively coupled to the memory. The processor is configured to identify an internet protocol (IP) address associated with potentially malicious content. The processor is further configured to define each row of a matrix by applying a different subnet mask from a plurality of subnet masks to a binary representation of the IP address to define that row of the matrix. The processor is further configured to provide the matrix as an input to a convolutional neural network (CNN), and receive, from the CNN, a score associated with a maliciousness of the IP address. In some embodiments, the processor can further be configured to identify a set of characteristics associated with the IP address, define a feature vector based on the set of characteristics, and provide the feature vector as an input to the CNN. In some embodiments, the processor can be configured to infer a representation of an internet service provider (ISP) associated with the IP address by providing the IP address as an input to a machine learning model and providing the representation as an input to the CNN.

In some embodiments, a non-transitory processor-readable medium stores code representing instructions to be executed by a processor. The instructions include code to cause the processor to identify an IP address associated with potentially malicious content, and define a matrix based on the IP address. The instructions further include code to cause the processor to infer a representation of an internet service provider (ISP, also referred to herein as "provider") associated with the IP address by providing the IP address as an input to a first machine learning model. The instructions further include code to cause the processor to provide the matrix and the representation as inputs to a second machine learning model, and receive, from the second machine learning model, a score associated with a maliciousness of the IP address.

In some embodiments, a method can include identifying an IP address associated with potentially malicious content, and defining a matrix based on the IP address, each row of the matrix including a representation of a different subnet of the IP address. The method can further include identifying a set of characteristics associated with the IP address and defining a feature vector based on the set of characteristics. The method can further include providing the matrix and the feature vector as inputs to a convolutional neural network (CNN), and receiving, from the CNN, a score associated with a maliciousness of the IP address.

Computer files ("computer file(s)" or "file(s)") such as text or document files (collectively, "document file(s)") communicated via internet communications can be a common delivery mechanism for malware (i.e., malicious software). For example, document files can include embedded, executable scripts or macros that, in some cases, can be configured to cause malicious activity on a host device (e.g., a computer) or in a host environment (e.g. of a computer, virtual machine, etc.).

Despite the diversity of today's malware landscape, malicious activity, including the distribution of malware is often accomplished via communication with the internet. Some examples include Remote Administration Tools, ransomware, coin miners, and espionage tools. These are configured to either accept commands and transmit payloads, communicate with a key server, or exfiltrate sensitive information. One approach to protect against these communications is to maintain various block-lists and/or black-lists that contain malicious artifacts such as domain names, URLs, and IP addresses. This approach is time consuming, requires an increasing amount of resources to maintain, and is prone to evasion. Maintenance can be difficult because while domain names are often used to successfully identify malicious hosts, they can be switched on and off and redirected at. A domain associated with malicious content at a first time may be associated with benign content at a second time. Similarly, malicious IP addresses on the block-list and/or black-list might use different addresses from the same network to have a "cool-down period". They may maintain this cool-down period until they are removed from the respective block-lists and/or black-lists. An adaptation of the IPv6 protocol is predicted to introduce even more challenges in maintaining block-lists by increasing the IP space from the current 4.3 billion to 2128. Unlike domain names, however, IP addresses are fundamental, un-maskable (when bidirectional communication takes place), and often tied to physical internet infrastructure, serving as a target for detecting malicious actors. The embodiments disclosed herein include methods and apparatus for representing IP addresses in an IP space using machine learning tools, classifying and/or identifying neighborhoods and/or similarities of IP addresses with a reputation that is associated with potentially malicious activities/actors.

FIG. 1 is a schematic of the hierarchical organization of infrastructure supporting a communication network representing an IP space. In this hierarchical organization, an IP address can be traced from a domain hosted on an IP address through an ISP and autonomous system (AS) to the Internet Assigned Numbers Authority (IANA). For example, locating the website "sophos.com", resolves to the IP address 104.100.21.57, which is served by the ISP Akamai. The Akamai ISP owns various, non-contiguous IP prefixes, one of which is 104.100.16.0/20 where the IP address hosting the website "sophos.com" is located. ISPs can be further grouped into regional registries. For example, as shown in FIG. 1, ISPs can be grouped into an American Registry for Internet Numbers (ARIN) under the Internet Assigned Numbers Authority (IANA).

Various ISPs apply different security measures on their networks. Some providers are careful to maintain the reputation of their infrastructure and are quick to remove malicious activities while other providers exclusively host malicious content. Other providers may be less security conscious, or even be openly indifferent to hosting customers undertaking malicious activity. Understanding how a threat level varies between ISPs can help inform users and/or organizations to take remedial actions that include block/no-block decisions about IP addresses and thus improve protection.

Telemetry data can indicate that malicious activities are not evenly distributed over an IP space. Moreover, reputation of IP addresses is also not evenly distributed. There can be one or more non-uniform clusters of "bad neighborhoods" or "areas", that is, sets of IP addresses that are appropriately classified with a "bad" or "potentially malicious" reputation, for example regions where IP addresses associated with malicious content are clustered. Data further show that some ISPs can have contributions to the malicious landscape that are disproportionate to the size of the IP space they own and/or occupy. Additionally, as shown in FIG. 1, there can often be available additional data associated with the infrastructure supporting the IP address in the IP space that can be used to generate representations of the IP address and/or to classify potential maliciousness of an IP address based on the representation. For example, in addition to the ISP of an IP address, the hosting country of the provider can be publicly available information. In some instances, information associated with the domain of the IP address can also be available to augment the feature set with information, such as, for example the nameserver resolving an A record of a domain (which maps a domain name to the IP address) and a domain pointer (PTR) (resolves an IP address to a domain or host name) record of the domain, the IP address of the nameserver, and the WHOIS registrar and registrant of the domain. This data can be used to better predict and/or classify the potential maliciousness of an IP address.

The disclosed embodiments include methods and apparatus to represent and classify an uneven pattern of distribution of reputation based on maliciousness in infrastructure associated with an IP address space and using this framework to assign reputation scores to blocks of various sizes of infrastructure associated with the IP address space. A lower score can indicate that the probability of the IP address hosting malicious content is low while a higher score can indicate the IP address comes from a "neighborhood" in a representational space that is known for hosting malicious content (or has similar characteristics with other IP addresses hosting malicious content).

Figure 2:
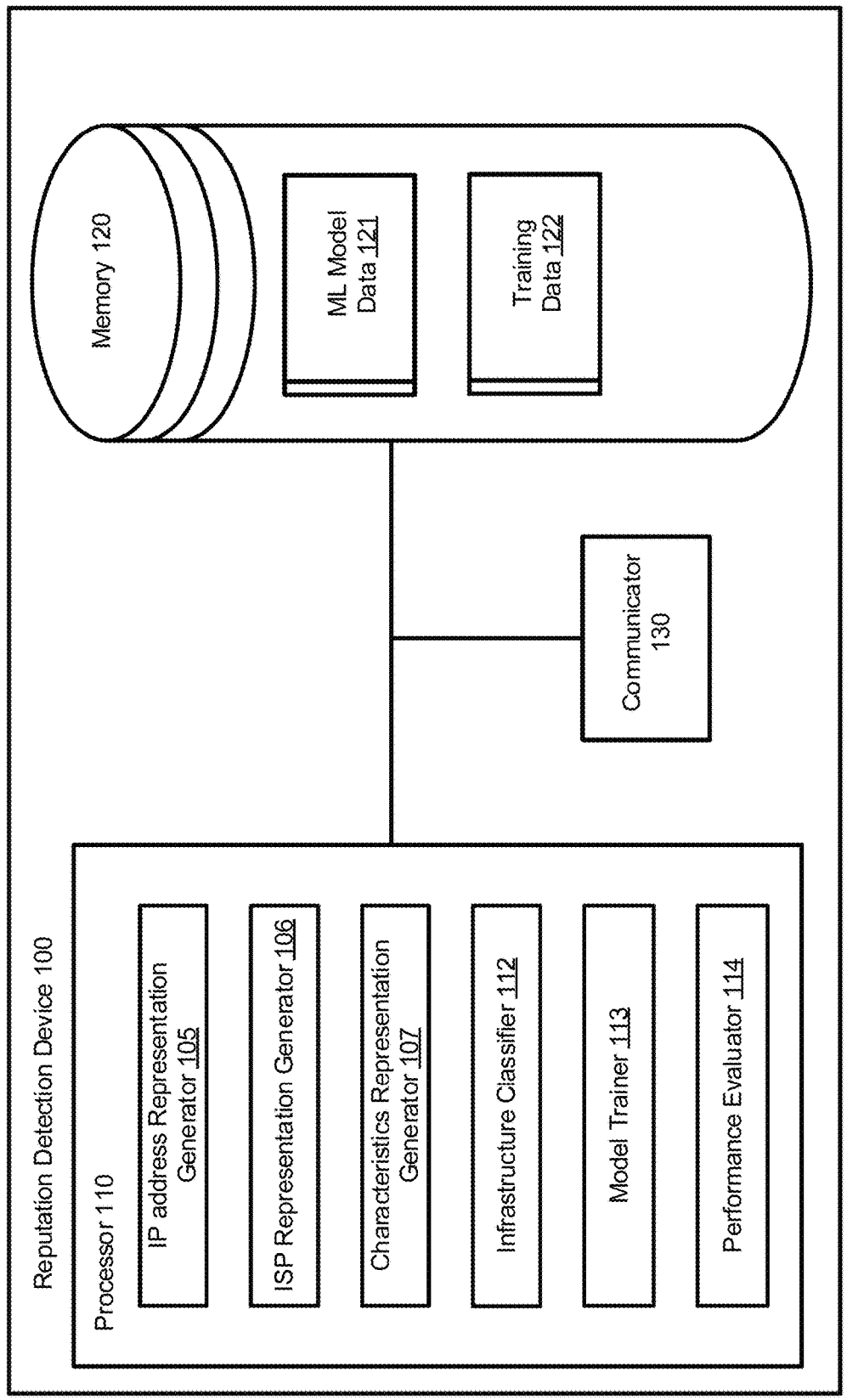
FIG. 2 is a schematic block diagram of a Reputation Detection (RD) Device for classifying and/or identifying maliciousness of infrastructure, including IP addresses, according to an embodiment.

FIG. 2 is a schematic block diagram of a Reputation Detection (RD) Device 100 for identifying IP addresses associated with malicious content, according to an embodiment. The RD device 100 can be used to build, execute and/or implement ML models to represent infrastructure such as IP addresses associated with an IP address space of a communication network. In some implementations, the RD device 100 can use ML models to represent and/or classify the IP addresses. The RD device 100 can use ML models to assign reputation scores and/or infer a maliciousness score associated with an IP address based on the representation of the IP address. The RD device 100 can be used to build and/or execute ML model(s) based on an uneven distribution of malicious content associated with infrastructure in a representational space. In some embodiments, the RD device 100 can be used to build and/or execute ML model(s) that support a multi-layered protection approach to classify malware associated with, for example, spam, a phishing website, or malware calling home.

In some embodiments, the RD device 100 can be used to implement an ML model that is flexible to receive, as input, an additional or extended set of characteristics that provides information in addition to a representation of an IP address that can potentially improve accuracy of classification or identification of maliciousness associated with the IP addresses. In some implementations, a flexible multi-layered ML model can allow for continuous improvement over time as the malicious landscape changes. Such a flexible ML model can allow a threat detection system that is more robust to blind spots, such as those inherent in block lists, by having the ability to incorporate multiple sources of information if and when available, enabling accurate detection of malicious traffic.

The Reputation detection (RD) device 100, also referred to herein as "the RD device" or "the device", can be a hardware-based computing device and/or a multimedia device, such as, for example, a compute device, a server, a desktop compute device, a laptop, a smartphone, a tablet, a wearable device, and/or the like. The RD device 100 includes a processor 110, a memory 120 and a communicator 130.

The processor 110 can be, for example, a hardware based integrated circuit (IC) or any other suitable processing device configured to run and/or execute a set of instructions or code. For example, the processor 110 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 110 is operatively coupled to the memory 120 through a system bus (for example, address bus, data bus and/or control bus).

The processor 110 can be configured to receive potentially malicious content that includes an IP address associated with the potentially malicious content and generate a prediction of maliciousness associated with the IP address. The processor 110 includes and/or is configured to execute an IP address representation generator 105, an ISP representation generator 106, a characteristics representation generator 107, an infrastructure classifier 112, a model trainer 113, and a performance evaluator (also referred to as "the evaluator") 114. The IP address representation generator 105, the ISP representation generator 106, the characteristics representation generator 107, the infrastructure classifier 112, the model trainer 113, and/or the performance evaluator 114 can be software stored in memory 120 and executed by processor 110 (e.g., code to cause the processor 110 to execute the IP address representation generator 105, the ISP representation generator 106, the characteristics representation generator 107, the infrastructure classifier 112, the model trainer 113, and/or the evaluator 114 can be stored in the memory 120) and/or a hardware-based device such as, for example, an ASIC, an FPGA, a CPLD, a PLA, a PLC and/or the like.

The IP address representation generator 105 can be configured to prepare an IP address for use by the infrastructure classifier 112. In some embodiments, the IP address representation generator 105 can include a preprocessor and an MIL model (not shown in FIG. 2). The preprocessor included in the IP address representation generator 105 can be configured to identify and preprocess the IP address to provide the IP address in a suitable format to the MIL, model included in the IP address representation generator 105. In some implementations, the MvL model included in the IP address representation generator 105 can be a convolutional neural network (CNN) configured to receive the IP address in a suitable format and generate a representation of the IP address that can be used as an input by a classifier (e.g., the infrastructure classifier 112) to generate a classification of maliciousness of the IP address.

An IP address can be expressed in multiple different forms including the standard decimal dotted representation of 8.8.8.8, integer representation 134744072, and the binary representation 00001000.00001000.00001000.00001000. In some implementations, the pre-processor included in the IP address representation generator 105 can be configured to identify the IP address, express the IP address in a selected representation (e.g., binary representation) and define a matrix based on the representation of the IP address. In some implementations, the pre-processor included in the IP address representation generator 105 can be configured to define each row of the matrix representing the IP address by applying a different subnet mask from a set of subnet masks to the binary representation of the IP address to define that row of the matrix. Said in another way, in some implementations, an IP address expressed in a binary form can be converted, by the preprocessor included in an IP representation generator 105, to a matrix with each row corresponding to a single masked subnet, such that in each $i^{th}$ row the last i bits of the full binary IP address are set to zero (e.g., zeroed out). For example, row 32 of a matrix representing an IP address can include the /32 subnet of the IP address itself, and the 24th row can include the /24 subnet of the IP address. That is, let $b \in \{0, 1\}^{32}$ be the binary representation of an IP address and $IP \in \{0, 1\}^{32 \times 32}$ a matrix representation of an IP address such that $a_{i,j} = b_j$ if $i \geq j$, and $a_{i,j} = 0$ if $(i < j)$.

$$IP_{m,n} = \begin{bmatrix} a_{1,1} & 0 & \cdots & 0 \\ a_{2,1} & a_{2,2} & \cdots & 0 \\ \vdots & \vdots & \ddots & \vdots \\ a_{m,1} & a_{m,2} & \cdots & a_{m,n} \end{bmatrix} \quad \text{Equation (1)}$$

The preprocessor included in the IP representation generator 105 can be configured to provide the matrix to the ML model included in the IP representation generator 105.

The ML model included in the IP representation generator 105 can be configured to receive the matrix as input and modify the matrix representation to generate a feature vector that captures important features of the matrix representation of the IP address. The feature vector can be provided as input to the infrastructure classifiers 112 to generate a prediction of maliciousness of the IP address as described further below.

In some implementations, the ML model included in the IP representation generator 105 can be configured to receive the matrix and assign and/or identify importance of various aspects or various features of the matrix by sliding a convolutional window across the matrix. In some implementations, the ML model can be a CNN. The CNN can be configured such that the CNN slides a convolution window across the matric to identify importance of features in the matrix. The ML model can be trained by the model trainer 113 to learn to identify the important features of the matrix representation and generate the feature vector based on the important features of the matrix representation.

Figure 3:
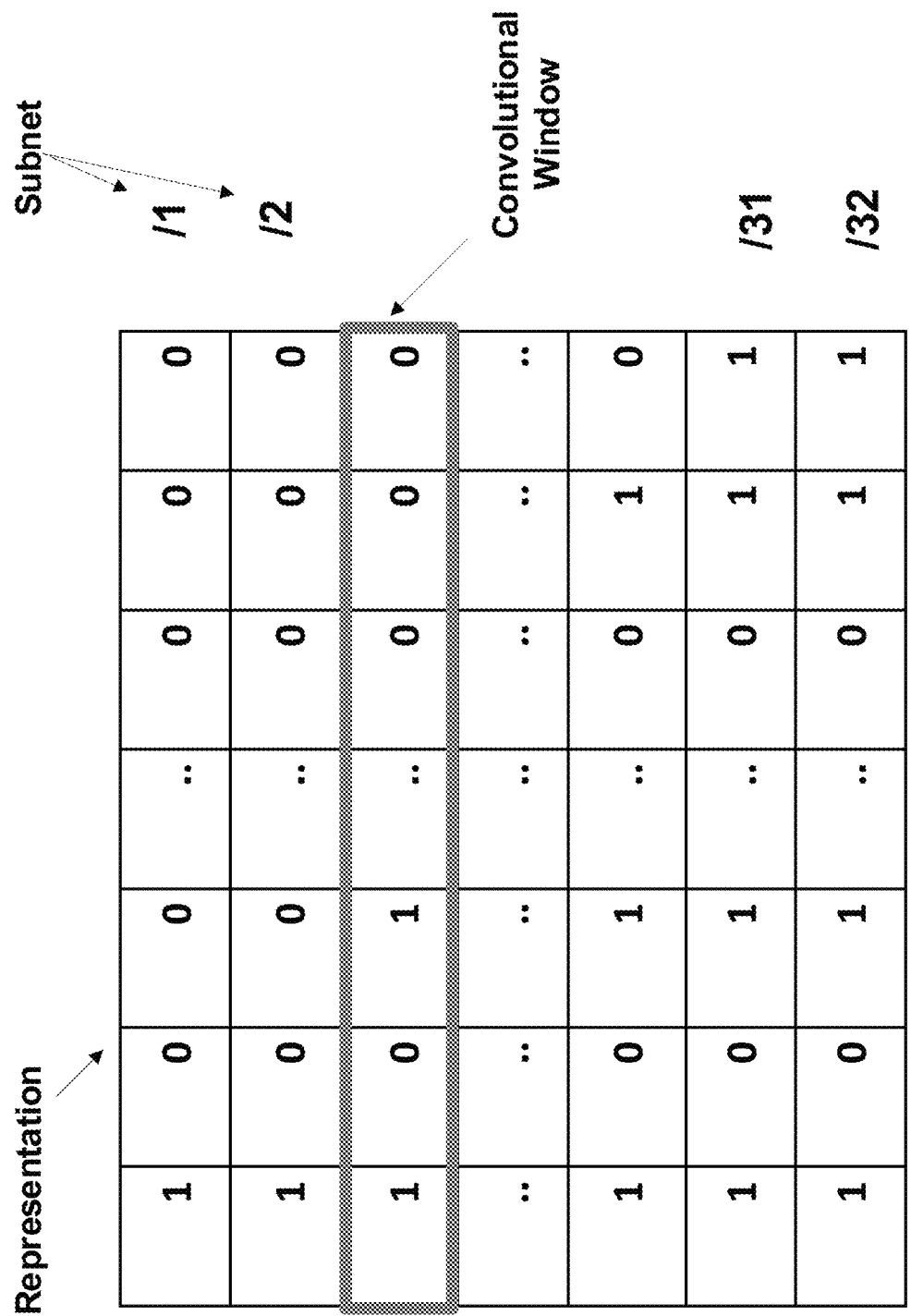
FIG. 3 is a schematic illustration of a matrix representation of an IP address implemented by an RD device, according to an embodiment.

FIG. 3 illustrates an example matrix representation of an IP address in a binary form, indicating a convolutional window that is being slid across the matrix. The ML model included in the IP address representation generator 105 can be trained to handle the subnets at a sufficient level of granularity such that the important or informative aspects of the IP address are sufficiently captured to generate the feature vector that can be provided to the infrastructure classifier 112. In some implementations, the ML model included in the IP address representation generator 105 can use a 1-dimensional convolution with shape (1,32) and stride (1,1) across the generated matrix. The IP address representation generator 105 can generate a representation of the IP address in an abstract representational space by accounting for the importance of various aspects or various features of the matrix. This representation can then be used to generate a feature vector to be provided to the infrastructure classifier 112 to generate a classification and/or a prediction of a maliciousness of the IP address or a score indicating a maliciousness of the IP address.

While described above has having an ML model, in some implementations the IP address representation generator 105 does not include an ML model. In such implementations, the preprocessor of the IP address representation generator 105 can define the matrix based on the IP address (e.g., using equation 1). The matrix can then be provided as the feature vector to the infrastructure classifier 112. The infrastructure classifier (described in further detail herein) can be a CNN and can be trained to identify the importance of each subnet in the matrix to classify the IP address (e.g., as malicious or benign).

Returning to FIG. 2, the processor 110 includes the ISP representation generator 106 that can be configured provide input to the infrastructure classifier 112 that can improve an accuracy of classification, prediction, and/or generation of a score indicating maliciousness performed by the infrastructure classifier 112. In some instances, there may be available additional information associated with the IP address that may be useful to augment the identification and/or classification of maliciousness of the IP address. One example of additional information associated with the IP address is the ISP associated with the IP address. The ISP representation generator 106 can be configured to generate a representation of the ISP and provide the representation of the ISP as an input, in the form of a second feature vector, to the infrastructure classifier 112. The second feature vector provided by the ISP representation generator 106 can be in addition to a first feature vector based on the representation of the IP address provided by the IP address representation generator 105. In some implementations, the first feature vector and the second feature vector can be concatenated and provided to the infrastructure classifier 112. The infrastructure classifier 112 can use the second feature vector based on the representation of the ISP provided by the ISP representation generator 106 and the first feature vector based on the representation of the IP address provided by the IP address representation generator 105, to generate the classification, prediction, and/or score associated with maliciousness of the IP address.

ISP data can be informative about a maliciousness of an IP address. Malicious content is unevenly distributed across an IP address space (an abstract space defined by IP address representations), with some ISPs being associated with disproportionately large fractions of malicious content. FIG. 4A lists a top ten most malicious ISPs in a sample dataset, and their respective contributions to the malicious portion of IP addresses indicated by a metric referred to as a maliciousness ratio. The maliciousness ratio can be defined by the number of malicious IP addresses for a specific provider compared to its overall number of IP addresses in a dataset. ISPs are assigned a letter to preserve anonymity. As can be seen in FIG. 4A, contributions of ISPs to the malicious landscape can be disproportionate to the size of the IP space they own. For example, some providers like ISP-F, despite having a large IP address pool, are seemingly quick to shut down malicious actors on their network (resulting in a low maliciousness ratio). Some other providers like ISP-C, however, are particularly malicious and serve more malicious content as indicated by the 0.99 maliciousness ratio. The table in FIG. 4B shows the non-contiguous IP address ranges hosted by the prolifically malicious ISP-C. Thus, information related to the ISP can be used to increase an accuracy of identifying IP addresses that are associated with malicious content or malicious actors.

In some instances, ISP of an IP address can be publicly available information that can be looked-up and used to augment the information associated with an IP address. In some implementations, the ISP representation generator 106 can include a pre-processor (not shown in FIG. 2) that is configured to identify the IP address and look-up the ISP associated with the IP address to generate the representation of the ISP. In some implementations, the ISP representation generator 106 can be configured to use a database such as the ISP database offered by MAXMIND to look up and determine ISP information associated with identified IP addresses. Based on the table in FIG. 4B, observing disproportionately malicious organizations in one segment of the IP space may allow to generalize the knowledge to a different segment owned by the same ISP even though they may be non-contiguous segments. The ISP representation generator 106 can obtain the identity of the ISP associated with an IP address, which can be a string of variable length, and can convert the ISP identity information into the second feature vector that can be numerical and of a fixed length using any suitable process. In some implementations, the ISP representation generator 106 can be configured to convert the ISP identity information into the numerical second feature vector of a fixed length by providing the ISP identity information as an input to a hash function. Any suitable hash function may be used to achieve a desired second feature vector that can be provided to the infrastructure classifier 112.

In some instances, however, the ISP information may be unavailable. In some such instances, while ISP identity information may not be accessible at a time of prediction or classification of maliciousness of an IP address, portions of an IP addresses may be used to obtain information about a relationship between the IP address and the ISP associated with the IP address. In some implementations, the ISP representation generator 106 can include an ML model (not shown in FIG. 2) configured to receive the IP address and infer a representation of the ISP associated with the IP address.

In some implementations, the ISP representation generator 106 can be configured to generate the second feature vector based on the inferred representation of the ISP associated with the IP address. The ML model included in the ISP representation generator 106 can be trained by the model trainer 113 using training data that includes IP addresses with known labels indicating association with ISPs of known identity. The ML model included in the ISP representation generator 106 can be configured to learn to identify an identity of ISPs from the training data that may occupy one portion of an abstract space defined by representations of the labeled IP addresses. The ML model included in the ISP representation generator 106 can be configured to then generalize the learned knowledge to IP addresses without a label and without detailed IP address data or ISP identity data, represented in a different portion of the abstract space, but may be owned by the same ISP.

In some implementations, the ML model included in the ISP representation generator 106 can be configured to be trained by the trainer 113 using representational learning to sample IP addresses and map them to a common region in a representational space associated with ISPs. In some embodiments, the ML model included in the ISP representation generator 106 can be configured as a multi-class classifier trained by the trainer 113 to differentiate between identities. In some embodiments, the ML model included in the ISP representation generator 106 can be configured to learn the embedding of the ISP identities directly to generate the ISP representation following representational learning methods. In some implementations, a representational learning approach can be implemented, for example, using a triplet loss method in which a baseline (anchor) input is compared to a positive input and a negative input. The distance from the baseline input to the positive input is minimized, and the distance from the baseline input to the negative input is maximized.

In some implementations, the ML model included in the ISP representation generator 106 can be a CNN, and implement multiple variations in training objectives including for example a triplet loss function with semi-hard sample mining, a classical softmax function, or a CosFace loss function. In some implementations, any other suitable type of machine learning model can be used (e.g., decision tree, random forest, etc.).

In some instances, when implementing a triplet loss method, combinatorial explosion in the number of triplets for high class cardinality datasets can be navigated by careful selection of training samples. Training sample selection can be instrumental to the performance of the ML model included in the ISP representation generator 106, especially with an increasing the number of classes.

In some implementations, the ML model included in the ISP representation generator 106 can use a CosFace function and reformulate the softmax loss as a cosine loss by L2 normalizing both features and weight vectors to remove radial variations. CosFace can achieve an output associated with clustering ISPs with minimum intra-class variance and maximum inter-class variance. Such an output may be suitably configured to meet a desired goal of ISP representation learning. Based on the CosFace function a cosine margin term can be introduced to further maximize the decision margin in an angular representational space. A minimum intra-class variance and maximum inter-class variance can be achieved by virtue of normalization and cosine decision margin maximization.

In some such implementations, the trainer 113 can train the ML model included in the ISP representation generator 106 to label IP addresses with their respective ISPs (or a representation thereof) and generate the representation of the IP address to include a representation of the ISP and in a shared abstract space of representation or shared embedding space based on the ISP. This representation of an ISP associated with an IP address can circumvent a need for an ISP lookup using a database as described previously.

Returning to FIG. 2, the processor 110 includes and/or executes the characteristics representation generator 107 that can be configured to generate a representation of an additional extended set of characteristics associated with an IP address that can provide information to potentially improve the performance of the infrastructure classifier 112 to classify, predict, and/or generate a score of a maliciousness of an IP address.

In some instances, in addition to an identity of an ISP associated with an IP address, additional data associated with the IP address including data on a hosting country of the provider and/or the domain of the IP address can be used to augment the information associated with an IP address. In some instances, the data can include a set of characteristics associated with the IP address including an identifier associated with a country associated with the IP address, a name-server associated with the IP address, a registrar associated with the IP address, a registrant associated with the IP address, and/or a pointer (PTR) record associated with the IP address. For example, as shown in FIG. 1, the name-server resolves an A record of the domain (which maps a domain name to the IP address) and a PTR (resolves an IP address to a domain or host name) record of the domain, the IP address of the nameserver, and the WHOIS registrar and registrant of the domain. One or more of these data can be used as a set of characteristics associated with the IP address. The characteristics representation generator 107 can be configured to identify the set of characteristics associated with an IP address and generate a representation of the set of characteristics in the form of a feature vector that can be provided to the infrastructure classifier 112 to generate a prediction, classification, and/or score of maliciousness of the IP address.

The characteristics representation generator 107 can include a pre-processor (not shown in FIG. 2) that can be configured to identify a set of characteristics associated with the IP address. The pre-processor included in the characteristics representation generator 107 can obtain the set of characteristics associated with an IP address, which can be alphanumeric or strings of variable length, and provide each characteristic from the set of characteristics as an input to a hash function to define the representation of the set of characteristics in the form of a feature vector of a fixed length. Any suitable hash function may be used to achieve a desired feature vector that can be provided to the infrastructure classifier 112.

In some implementations, the characteristics representation generator 107 can be configured to receive the representation of the set of characteristics and generate the feature vector to be provided to the infrastructure classifier 113. In some instances, a first subset of the set of characteristics associated with an IP address may be identified (having known values) and a second subset of the set of characteristics may be unidentified, unknown or unavailable (missing values). The characteristics representation generator 107 can be flexible to accept and incorporate the set of characteristics including the first subset and the second subset to generate the combined representation of the set of characteristics in the form of a feature vector to be provided to the infrastructure classifier 112. The characteristics representation generator 107 can be configured to define the feature vector based on the first subset of the set of characteristics and a predefined value for each characteristic from the second subset of characteristics. For example, the characteristics representation generator 107 can be configured to replace missing values in the second set of characteristics associated with the IP address (e.g., missing information related to any of the above listed characteristics associated with infrastructure) with a predetermined and/or predefined value (e.g., an extreme value).

In some implementations, the characteristics representation generator 107 can include an ML model (not shown in FIG. 2) that can define the feature vector and/or can be configured to learn to assign importance to various characteristics in the feature vector. Accordingly, in such implementations, a feature vector with assigned importance can be generated and provided to the infrastructure classifier 112.

In some implementations, the characteristics representation generator 107 can be configured to generate a representation of the set of characteristics in the form of a third feature vector, to the infrastructure classifier 112. The third feature vector provided by the characteristics representation generator 107 can be in addition to a second feature vector provided by the ISP representation generator 106 and can be in addition to a first feature vector (or matrix) based on the representation of the IP address provided by the IP address representation generator 105. In some implementations, the first feature vector, the second feature vector, and the third feature vector can be concatenated and provided to the infrastructure classifier 112. In some implementations, the infrastructure classifier 112 can use the third feature vector based on the representation of the set of characteristics provided by the characteristics representation generator 107, the second feature vector based on the representation of the ISP provided by the ISP representation generator 106, and the first feature vector based on the representation of the IP address provided by the IP address representation generator 105, to generate the classification, prediction, and/or score associated with maliciousness of the IP address.

Returning to FIG. 2, the processor 110 includes the infrastructure classifier 112 configure to receive input from the IP address representation generator 105 and generate the classification, prediction, and/or score associated with maliciousness of the IP address. In some implementations, the infrastructure classifier 112 is an ML model. In some implementations, the infrastructure classifier 112 is a CNN configured to receive as an input one or more feature vectors or a feature vector that includes infrastructure information associated with an IP address. The input can include a first feature vector (or matrix) based on the representation of the IP address provided by the IP address representation generator 105. In some implementations, the input can further include a second feature vector based on the representation of the ISP provided by the ISP representation generator 106. In some implementations, the input can include a third feature vector based on the representation of the characteristics associated with the IP address provided by the characteristics representation generator 107. In some implementations, the infrastructure classifier 112 can receive as input the first, second, and third feature vectors concatenated to form a single feature vector.

The infrastructure classifier 112 can be trained by the model trainer 113 and configured to receive the input and provide a maliciousness classification of the IP address, which can include an indication of whether the IP address is malicious. The infrastructure classifier 112, in some implementations, can provide a prediction or an indication of a classification of maliciousness of the IP address and/or a score associated with a maliciousness of the IP address. The infrastructure classifier 112, in some implementations, can provide a confidence value associated with the indication or score of whether the IP address is malicious. In some implementations, the infrastructure classifier 112 can provide an indication of a relative location of the IP address in a representational space associated with maliciousness that is learned by the infrastructure classifier 112 during training by the trainer 113. For example, the infrastructure classifier 112 can provide an indication of whether and/or to what degree of confidence the relative location of the IP address in an abstract representational space is in a "malicious region" in that abstract representational space learned by the ML model.

The infrastructure classifier 112 can provide a maliciousness score associated with the indication of predicted maliciousness of the IP address. In some implementations, the infrastructure classifier 112 can provide an indication of an association between an IP address and a known region or class of IP addresses in an abstract representational space (e.g., an association between the IP address and a malicious region in the abstract representational space related to known malicious content and/or malicious actors). The infrastructure classifier 112 can generate a predicted score associated with a maliciousness of the IP address among several known classes of malicious infrastructures and/or provide a confidence value associated with the maliciousness score/classification.

As described previously, the ML model included in the IP address representation generator 105, while described to be an individual ML model can, in some implementations, be a portion of a larger ML model. For example, in some implementations, the ML model included in the IP address representation generator 105 can be a CNN that is a portion of a larger CNN that includes the infrastructure classifier 112 (also a CNN).

The ML model included in the ISP representation generator 106, while described to an individual ML model can, in some implementations, be a portion of a larger ML model. For example, in some implementations, the ML model included in the ISP representation generator 106 can be a CNN that is a portion of a larger CNN that also includes the infrastructure classifier 112 and/or the IP address representation generator 105 each of which is also a CNN.

The ML model included in the characteristics representation generator 107, while described to an individual ML model can, in some implementations, be a portion of a larger ML model. For example, in some implementations, the ML model included in the characteristics representation generator 107 can be a CNN that is a portion of a larger CNN that also includes the ML model included in the ISP representation generator 106, and/or the infrastructure classifier 112 each of which is also a CNN.

Figure 6:
FIG. 6 is a schematic illustration of a framework of a multi-input machine learning (ML) model to represent, classify, and/or identify potentially malicious IP addresses as implemented by an RD device, according to an embodiment.

FIG. 6 is an illustrations of a framework of an example ML model that is a CNN, implemented by an RD device 600, according to an embodiment. The RD device 600 can be substantially similar in structure and/or function to the RD device 100 described above. The CNN shown in FIG. 6 includes a portion 605 that is an IP address representation generator (substantially similar in structure and/or function to IP address representation generator 105), a portion 606 that is an ISP representation generator (substantially similar in structure and/or function to ISP representation generator 106), a portion 607 that is a characteristics representation generator (substantially similar in structure and/or function to characteristics representation generator 107), and a portion 612 that is an infrastructure classifier (substantially similar in structure and/or function to infrastructure classifier 112).

The example ML model 608 is configured to receive a total of eight inputs. Six of the eight inputs are configured to be provided as input to a hash function and the output of the hash function to be provided as a feature vector to the input layer of the respective portions: ISP, country, name-server, registrar and registrant name of the domain, and the PTR record. The remaining two inputs are based on the subnet matrix representation described in Equation 1 above. Each of the inputs that are not in IP address format are passed to a series of Dense blocks of 4-layers each: (1) a Fully Connected layer (FC), (2) a Layer Normalization layer, (3) a Dropout layer with a dropout probability of 0:05, and (4) an Rectified Linear Unit (ReLU) activation. For inputs including the IP address, the input is processed with a 2D convolutional layer with 64 filters with a kernel size of 1×32 and a stride of 1×1 followed again by the 4-layer Dense block. These portions or blocks 605, 606, and 607 are connected by a concatenation layer and followed by a classification layer generates the classification. The classification layer includes a dense layer followed by a sigmoid activation function.

While the ML models are described herein as CNNs, in some alternative implementations, the RD device 100 can include one or more ML models included in the IP address representation generator 105, the ISP representation generator 106, the characteristics representation generator 107, and/or the infrastructure classifier 112 that can be any suitable ML model build and/or trained using any suitable approach (e.g., other types of neural networks, random forests, decision trees, etc.).

One or more of the ML models disclosed herein can include a statistical model, a mathematical model, or a probabilistic model, implementing a suitable algorithm to be used in the RD device 100. In some implementations, one or more of the ML models described herein can include one or more neural network models. In some implementations, one or more of the ML models described herein can include one or more decision tree models. In some implementations, one or more of the ML models described above can include one or more random forest models. In some implementations, one or more of the ML models described above can include one or more transformer-based models. In some implementations, the ML models described above can include a combination of two or more ML tools (e.g., a CNN and a decision tree, a CNN and a transformer model, or a decision tree and a CNN). In some implementations, one or more of the ML models described above can include a neural network configured to implement deep learning.

As an example, in some implementations, the ML model included in the IP address representation generator 105, the ML model included in the ISP representation generator 106, the ML model included in the characteristics representation generator 107, and/or the ML model included in the infrastructure classifier 112 can be a transformer based model. In some implementations, a task of generating a representation of an IP address can be treated as a natural language processing (NLP) task. The ML model included in the IP address representation generator 105 can be an transformer model that is configured to treat features associated with a potentially malicious content, including an IP address or any associated information regarding infrastructure, as a textual feature and not converted into a numerical feature, but considered as a representation and/or classification task using NLP methods.

In some implementations, the ML model included in the ISP representation generator 106 and/or the ML model included in the characteristics representation generator 107 can be configured to replace missing values associated with the potentially malicious content (e.g., missing information related to infrastructure) with the word "Unknown" and extract characteristics associated with the IP address with DistilBERT tokenizers Returning to FIG. 2, the processor 110 includes the model trainer 113 that can be configured to build and/or train the ML models included in the IP address representation generator 105, the ISP representation generator 106, the characteristics representation generator 107, and/or the infrastructure classifier 112. In some implementations, the model trainer 113 can be configured to obtain a sample data set and partition the sample dataset to generate a training set and a testing set. The model trainer 113 can analyze the training set and generate an initial impression of the data. For example, a model trainer 113 can analyze a data set including IP addresses associated with spam email campaigns and/or IP addresses involved in various malicious activities including malware repositories hosting malicious content, phishing sites, telephone scams, service theft advice sites, and call-home addresses used for command and control servers.

In some implementations, the ML models described herein can be built and/or trained by the model trainer 113 using the Pytorch framework with an Adam optimizer and 128 sized mini batches, optimizing over a binary classification objective.

Figure 5B:
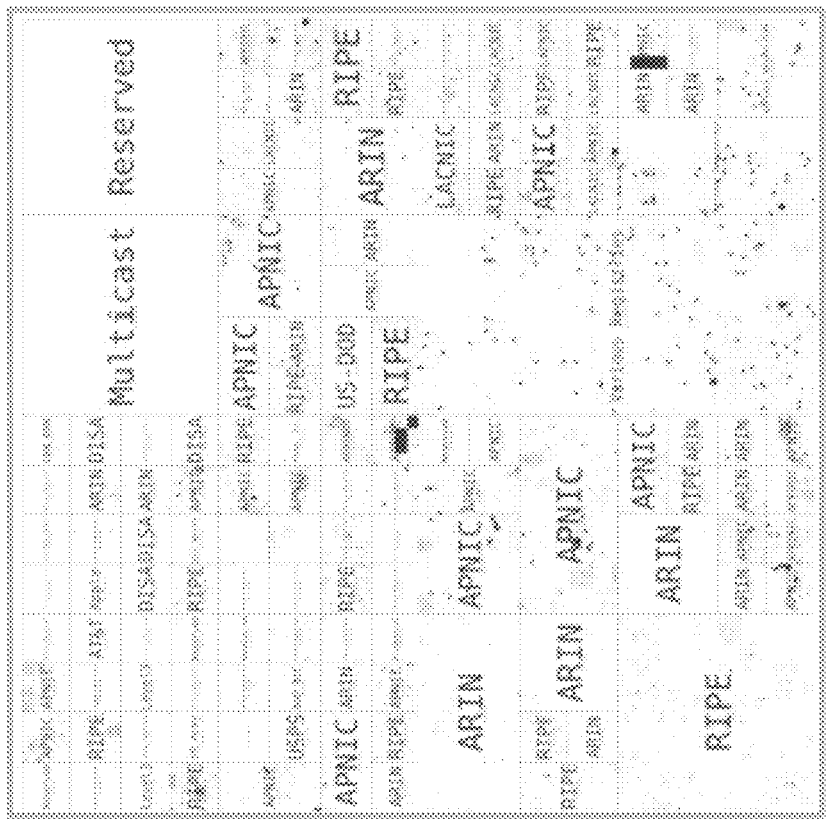
FIG. 5B is a schematic illustration of a visualization of a distribution of IP addresses, including sample data from a spam database of IP addresses, generated by an RD device, according to an embodiment.
Figure 5A:
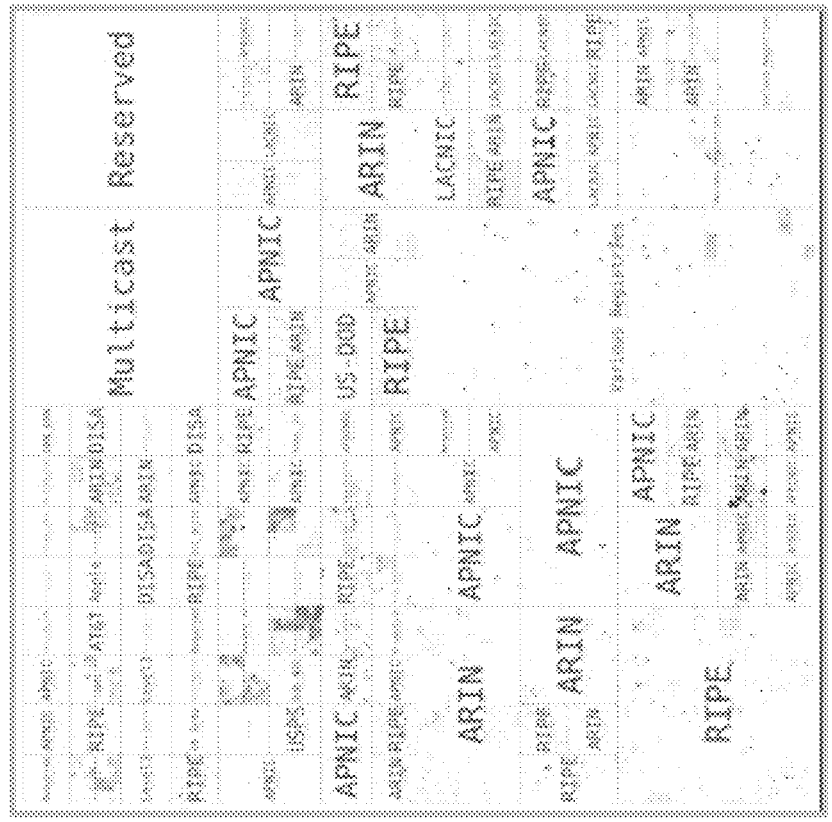
FIG. 5A is a schematic illustration of a visualization of a distribution of IP addresses, including sample data from phishing and malware repositories of IP addresses, generated by an RD device, according to an embodiment.

In some implementations, the model trainer 113 can generate an initial impression of the data by using Hilbert curves to visualize the data over an abstract representational space of IP address representations referred to herein as an IP space (e.g., IPv4 space). Hilbert curves can be used to generate a mapping transformation of data between 1-dimensional space and 2-dimensional space while preserving some representation of "closeness" or "locality", such that two data points that are close to each other in 1-dimensional space can usually be close to each other after the transformation in the 2-dimensional space. This transformation can produce a compact output that can be used to visualize and/or examine IP space in which Classless Inter-Domain Routing (CIDR) blocks are represented as contiguous rectangles, as shown in the example schematic representations in FIGS. 5A and 5B. FIG. 5A shows a representation of data from the data set including IP addresses from callhome/malware and phishing repositories. FIG. 5B shows a representation of data from the data set including spamming IP addresses. In the Hilbert curve shown in FIGS. 5A and 5B, blue points represent benign IP addresses and red points represent malicious IP addresses. More specifically, FIG. 5A shows the distribution of the dataset including phishing, malware repositories, and C2 addresses while FIG. 5B depicts the distribution of the spam database, over the Ipv4 space.

A model trainer 113 can train the infrastructure classifier 112 to identify clustered blocks on the curves that are overwhelmingly malicious as observed in FIGS. 5A and 5B. When comparing the two datasets on the Hilbert curve in FIGS. 5A and 5B, the model trainer 113 can train the infrastructure classifier 112 to identify that there may be little to no overlap between different datasets, as is the case with the two datasets shown in FIGS. 5A and 5B. The model trainer 113 can be configured to train the infrastructure classifier 112 to identify non-uniformities in the distribution of IP addresses in the representation. Because ISPs often own multiples of IP addresses, the model trainer 113 can be configured to track each ISP and determine the ratio of its ownership of IP addresses and the ratio of ownership of malicious IP addresses. If the malicious content were distributed evenly, the contributing ratio to IP addresses and the ratio of ownership of malicious IP addresses would be expected to be roughly even and comparable. The model trainer 113 can be configured to generate an ISP attribute based on a maliciousness ratio metric. The maliciousness ratio can be calculated to be the number of malicious IP addresses associated with a specific ISP compared to the overall total number of IP addresses in the dataset. The model trainer 113 can be configured to train the ISP representation generator 106 to predict varying maliciousness ratios between various ISP which can be configured to train the ISP representation generator 106 to predict an uneven distribution of maliciousness in the IP space. The model trainer can be configured to train the ISP representation generator 106 to identify ISPs that have contributions to the malicious landscape that are disproportionate to the size of the IP space they own like some of the ISPs listed in the table in FIG. 4A. The model trainer 113 can be configured to build and train ML models to identify and/or classify IP addresses based on their association to ISPs with disproportionate maliciousness contributions, such as providers like ISP-F, that are appear to manage and quickly shut down malicious actors on their network despite hosting a large pool of IP addresses, and providers like ISP-C or ISPs that have a maliciousness ratio above a specific threshold value (e.g., 0.90), indicating that they serve a large amount of malicious content.

The model trainer 113 can be configured to use the information obtained from the analysis of the data set, including from calculation of maliciousness ratios and other suitable scores and/or metrics associated with ISPs, to generate one or more ML models included in the IP address representation generator 105, the ISP representation generator 106, the characteristics representation generator 107, and/or the infrastructure classifier 112, as described above. For example, the model trainer 113 can use the Hilbert curves generated from analyzing a data set to confirm that the IP space is skewed in terms of "malicious regions" or ISPs that tend to harbor malicious activities. The model trainer 113 can then build and/or train an ML model that is included in the IP address representation generator 105, an ML model that is included in the ISP representation generator 106, and/or the ML model included in the infrastructure classifier(s) 112.

Returning to FIG. 2, the processor 110 in the RD device 100 includes performance evaluator 114. In some implementations, one or more of the IP address representation generator 105, the ISP representation generator 106, the characteristics representation generator 107, and/or the infrastructure classifier 112 can be evaluated by the evaluator 114. Each of the listed components can be suitably modified, based on the ML model data 121 obtained from memory 120, to improve or maintain performance metrics, such as, for example, accuracy, confidence level, rate of true positives, rate of false positives, an AUC measure associated with an ROC curve, etc. For example, the performance evaluator 114, also referred to herein as "the evaluator", can be configured to receive the output of the infrastructure classifier 112, including a classification of maliciousness, prediction of maliciousness, metrics, scores, and/or confidence values generated by the infrastructure classifier 112, and evaluate the accuracy of the outputs against a desired value or threshold value.

In some implementations, the performance evaluator 114 can obtain ground truth values of accuracy via analysis of training data and compare the ground truth values against the values generated by the infrastructure classifier 112. The performance evaluator 114 can analyze the output of the infrastructure classifier 112 by generating one or more aggregate values, calculate one or more confidence metrics based on one or more aggregate values, and evaluate the performance of one or more of the ML models included in the IP address representation generator 105, the ISP representation generator 106, the characteristics representation generator 107, and/or the infrastructure classifier 112. For example, performance evaluator 114 can evaluate the performance of the infrastructure classifier 112 at classifying the IP addresses by comparing the confidence metrics against one or more threshold criteria. As another example, performance evaluator 114 can evaluate the performance of the ML model included in the ISP representation generator 106 at inferring ISP representations based on IP address data by comparing the ISP representations generated against known ISP identities.

In some implementations, the evaluator 114 can be configured to send, based on the comparison of the one or more confidence metrics and the one or more criteria, an indication to retrain one or more of the ML models included in the IP address representation generator 105, the ISP representation generator 106, the characteristics representation generator 107, and/or the infrastructure classifier 112 or an indication to choose one set of the ML models implementing one approach over another set of the ML models implementing another approach. In some implementations, the evaluator 114 can be configured to send, based on the comparison of the one or more confidence metrics and the one or more criteria, an indication to discard and/or discontinue use of one or more of the ML models included in the IP address representation generator 105, the ISP representation generator 106, the characteristics representation generator 107, and/or the infrastructure classifier 112. In some implementations, the evaluator 114 can use the confidence metrics to evaluate methods to retrain the ML model 112. For example, based on the confidence metrics associated with a particular set of artifacts the evaluator 114 can use a particular set of artifacts or IP addresses (e.g., artifacts statistically similar to the ones associated with the confidence metrics) in the training data set to retrain an ML model to improve performance with respect to the set of artifacts with the confidence metrics that triggered the retraining.

In some embodiments, the performance evaluator 114 can receive an indication of one or more threshold criteria to evaluate the confidence values or metrics associated with a classification of a set of IP addresses by infrastructure classifier 112. In some implementations, the evaluator 114 can receive the threshold criteria from a user or a human analyst. In some implementations the evaluator 114 can analyze a set of IP addresses and confidence values associated with the IP addresses and generate suitable criteria. In some implementations, the evaluator 114 can be configured to calculate a confidence metric associated with a set of artifacts in a test data set based on a calculation of a number IP addresses identified to be potentially malicious or associated with a specific ISP. In some implementations, the confidence metric can be generated by comparing the identification of maliciousness of each IP address by the infrastructure classifier 112, against a ground truth data with known labels of maliciousness associated with the IP addresses tested. In some implementations, the confidence metric can be based on an estimate of a number or fraction of true positive identifications and/or a number or fraction of false positive identifications. In some implementations, the confidence metric can be based on an area under the curve (AUC) measure generated based on a ROC plot based on true positive identifications and false positive identifications in a set of IP addresses tested.

The memory 120 of the maliciousness classification device 100 can be, for example, a random-access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 110 to perform one or more processes, functions, and/or the like (e.g., the IP address representation generator 105, the ISP representation generator 106, the characteristics representation generator 107, the infrastructure classifier 112, the model trainer 113, and/or the performance evaluator 114). In some implementations, the memory 120 can be a portable memory (e.g., a flash drive, a portable hard disk, and/or the like) that can be operatively coupled to the processor 110. In other instances, the memory can be remotely operatively coupled with the maliciousness classification device. For example, a remote database server can be operatively coupled to the maliciousness classification device.

The memory 120 can store ML model data 121 and training data 122. The ML model data 121 can include data associated with the ML models included in the IP address representation generator 105, the ISP representation generator 106, the characteristics representation generator 107, and/or the infrastructure classifier 112, including parameters used to build and/or train each of the ML models, and values used during the execution of the ML models (e.g., temporary variables, return addresses, and/or the like). The ML model data 121 can also include data used by the ML models to process and/or analyze an IP address (e.g., weights associated with the nodes of a neural network, parameters associated with normalization of inputs by one or more normalization layers of the neural network, decision points associated with the neural network, and/or other information related to the neural network).

The training data can include multiple sets of data including known labels of maliciousness associated with each IP address. For example, the training data can include IP addresses pre-categorized into categories such as, for example, malicious IP addresses and benign IP addresses, or types of malicious IP addresses. The training data can be used to provide ground truth data that can be used to train and/or test the ML models included in the IP address representation generator 105, the ISP representation generator 106, the characteristics representation generator 107, and/or the infrastructure classifier 112, to perform classification of IP addresses.

The communicator 130 can be a hardware device operatively coupled to the processor 110 and memory 120 and/or software stored in the memory 120 and executed by the processor 110. The communicator 130 can be, for example, a network interface card (NIC), a Wi-Fi™ module, a Bluetooth® module and/or any other suitable wired and/or wireless communication device. Furthermore, the communicator 130 can include a switch, a router, a hub and/or any other network device. The communicator 130 can be configured to connect the maliciousness classification device 100 to a communication network (not shown in FIG. 1). In some instances, the communicator 130 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 130 can facilitate receiving and/or transmitting data, files through a communication network. In some instances, a received file can be processed by the processor 110 and/or stored in the memory 120 as described in further detail herein.

In use, the processor 110, included in the RD device 100, can be configured to receive a file or artifact associated with an internet communication. The file or artifact may be potentially malicious and may be stored in the memory 120. The preprocessor included in the IP address representation generator 105 in the processor 110 can identify an IP address associated with the file or artifact. The IP address representation generator 105 can pre-process the IP address and/or generate a matrix representation of the IP address, as described previously with reference to the IP address representation generator 105. For example, the IP address representation generator 105 may generate a matrix representation of the IP address by defining each row of the matrix by applying a specified subnet mask to a binary representation of the IP address. In some instances, an ML model included in the IP address representation generator 105 can then assign and/or identify an importance of various features of the matrix representation by sliding a convolutional window across the matrix. ML model included in the IP address representation generator 105 can then generate, as an output, a first feature vector based on the representation of the IP address. In some implementations, the matrix representation of the IP address can be provided as the output or feature vector of the IP address representation generator 105.

The preprocessor included in the ISP representation generator 106 can identify information associated with an ISP associated with the IP address (e.g., either an identify of the ISP or the finding that the ISP data is unavailable). In some implementations, the preprocessor included in the ISP representation generator 106 can look-up the identity of the ISP associated with the IP address at a database and provide the ISP identity as an input to a hash function to generate a second feature vector based on the representation of the ISP. In some implementations, the ML model included in the ISP representation generator 106 may receive the IP address as an input and infer an ISP representation in the form of a second feature vector based on the representation of the ISP and using a machine learning model.

The preprocessor included in the characteristics representation generator 107 can identify a set of characteristics associated with the IP address. In some implementations, the characteristics representation generator 107 can define a third feature vector based on the set of characteristics associated with the IP address. In some instances, a first subset of the set of characteristics can be identified while a second subset may be unidentified. The characteristics representation generator 107 may then define the third feature vector based on the first subset of set of characteristics and use a predefined value (e.g., extreme value) for each of the unidentified characteristics in the second subset.

The first feature vector, the second feature vector, and the third feature vector can be provided to the infrastructure classifier 112. In some implementations, the three features vectors can be concatenated and used to generate an output indicating a maliciousness associated with the IP address.

The infrastructure classifier 112 can generate a classification and/or a score associated with a maliciousness of the IP address. In some instances, the infrastructure classifier 112 can generate a confidence value associated with the classification and/or score associated with maliciousness of the IP address. The processor 110 can use the classification, score, and/or confidence value to evaluate the potentially malicious content and/or the IP address. The processor 110 can then preform a remedial action against the IP address based on the evaluation. For example the processor 110 can be configured to perform a remedial action against the IP address based on the score associated with a maliciousness of the IP address meeting a predefined criterion. In some implementations, the processor 110 can select a first remedial action based on the score meeting a first criterion but not meeting a second criterion, the second criterion being more stringent than the first, and the processor 110 can select a second remedial action based on the score meeting the second criterion. For example, the first criterion being that the score is greater than a first threshold value, and the second criterion being that the score is greater than a second threshold value greater than the first threshold value, a greater score indicating a higher level of maliciousness of the IP address. As an example, the first remedial action against the IP address can be restricting access to the IP address to a narrow set of circumstances and the second remedial action can be completely blocking access to the IP address. Remedial actions can include assigning labels of benign or malicious, or assigning labels of degree/class of maliciousness, blocking communication with the IP address based on a classification of being malicious, allowing communication with the IP address based on the IP address being classified benign, adding to a list of IP addresses to be monitored, and/or the like. The evaluator 114 can evaluate an output of the IP address representation generator 105, the ISP representation generator 106, the characteristics representation generator 107, and/or the infrastructure classifier 112, at any point in time, and perform actions including retraining one or more ML models, introducing new training data to retrain one or more of the ML Models, selecting use of one or more models, etc.

The classification of an infrastructure such as an IP address may be used in combination with other events or other factors to determine the likelihood of maliciousness of an application that is in communication with a given infrastructure. For example, an application with an unknown reputation that is determined to be in communication with an IP address with a likelihood of maliciousness may be determined to be a potential threat for further investigation or remediation. The application may be classified as high-risk or malicious. Additional restrictions or changes to rule thresholds may be instituted for a given network flow, application, compute instance, endpoint, or other artifact that relates to communication with a given IP address based on a classification. Other events associated with the network flow, application, compute instance, or other artifact that relates to the communication may be prioritized for investigation.

In general, various monitoring and management systems (e.g., the RD device 100) may cooperate to provide improved threat detection and response. In some implementations, classification of multiple aspects of infrastructure can be used in combination to provide improved threat detection and response. For example, a potential threat identified by URL classification may be communicated in an encrypted heartbeat and/or a periodic update from a device to a server or a threat management facility. More generally, the cooperation of systems can enable a wide variety of reactive measures that can improve detection and remediation of potential threats to an endpoint. Generally, having information about the URL classification associated with a network flow can allow for fine-grained rules and responses, that is, rules and responses that may be configured based on the URL classification associated with a network flow. In some implementations, having information about the URL classification associated with a network flow can support, for example, alerts and remedial actions that can be taken automatically based on the classification. Likewise, information can be communicated and recommendations of remedial actions can be made to users or administrators based on the classification.

Figure 7:
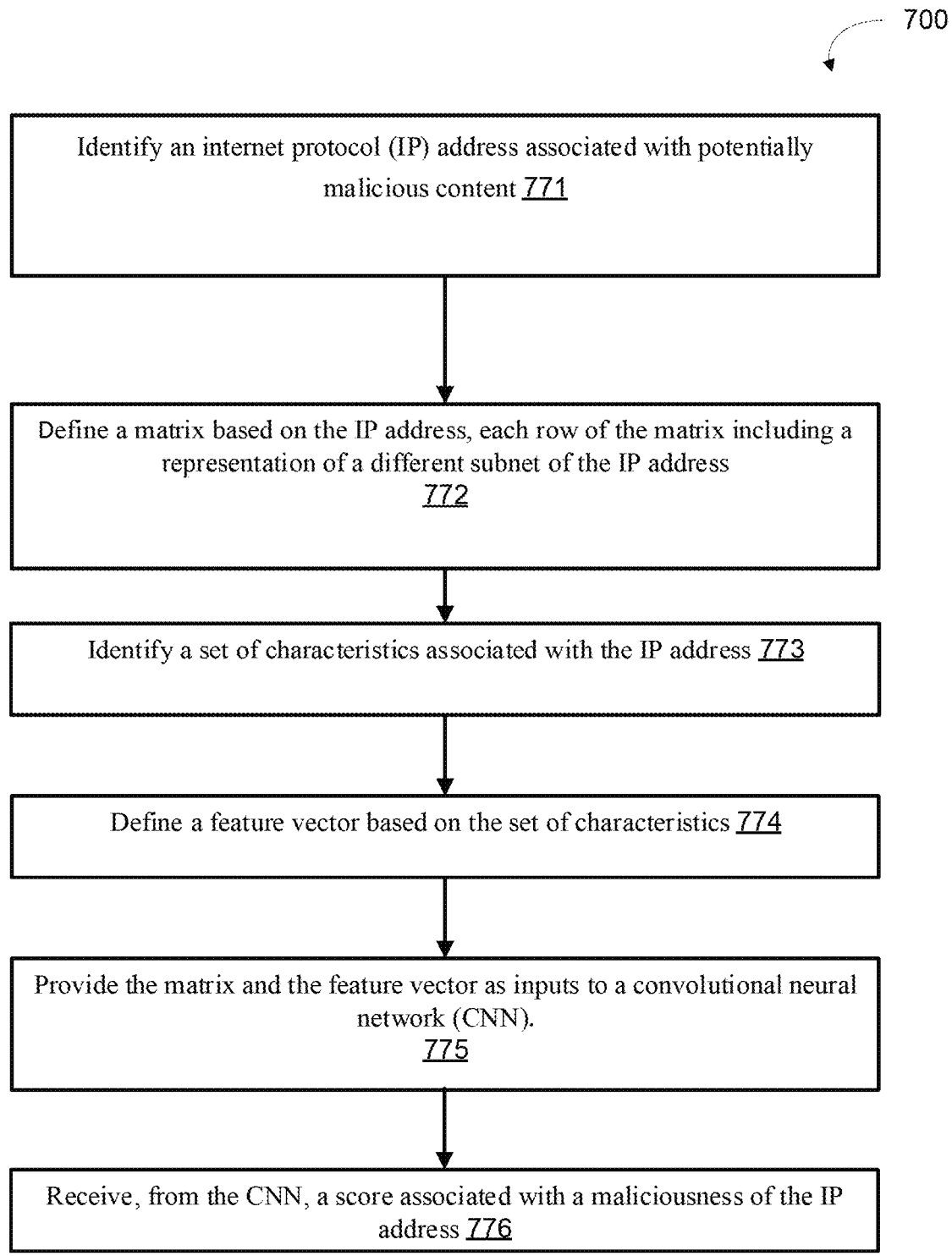
FIG. 7 is a flowchart illustrating a method for representing and classifying an IP address associated with potential maliciousness content, using a convolutional neural network (CNN), according to an embodiment.

FIG. 7 illustrates a flowchart describing an example method 700 of determining a maliciousness of a potentially malicious content associated with an internet communication using an RD device (e.g., RD device 100), according to one implementation. At 771, a processor of the RD device identifies an IP address associated with potentially malicious content. At 772, the processor of the RD device defines a matrix based on the IP address. Each row of the matrix includes a representation of a different subnet of the IP address. In some implementations, the matrix is provided to a CNN to generate a first feature vector. In some implementations, the matrix can be the first feature vector.

At 773, the processor of the RD device identifies a set of characteristics associated with the IP address. The set of characteristics can include an identifier associated with at least one of an internet service provider (ISP) associated with the IP address, a country associated with the IP address, a name-server associated with the IP address, a registrar associated with the IP address, a registrant associated with the IP address, or a pointer (PTR) record associated with the IP address.

At 774, the processor of the RD device defines a feature vector based on the set of characteristics. In some implementations, as described above, the feature vector generated based on the matrix is the first feature vector and the feature vector based on the set of characteristics is a second feature vector.

At 775, the RD device provides the first feature vector or the matrix and the second feature vector (based on the set of characteristics) as inputs to a convolutional neural network (CNN). In some implementations, the second feature vector based on the set of characteristics is concatenated with the first feature vectors based on the matrix based on the IP address. At 775, the RD device receives, from the CNN, a score associated with a maliciousness of the IP address.

In an example implementation, an RD device as described herein, was configured to use CNN models and transformer models to implement the ML models included in the IP address representation generator, the ISP representation generator, the characteristics representation generator, and the infrastructure classifier, to identify and/or classify maliciousness of IP addresses in a test set of data. The CNN based and transformer based ML models were similar in structure and/or function to the CNN based and transformer based ML models described herein with reference to the RD device 100 in FIG. 2.

A web-based dataset of IP addresses and domains was collected from telemetry that spans over half a year. In addition to IP address data information including the respective domains, the name-server resolving the address mapping record (A) and pointer records (PTR) of the domain, the IP address of the name-server, and the WHOIS registrar and registrant of the domain were collected. The IP addresses were labelled using custom tools, to obtain 455,248 IP addresses labeled malicious or benign.

The data was split into a training data set including 80% of the data and a test data set including 20% of the data. The test data set roughly corresponded to two months of data from telemetry. In the case of training the data, a malicious label was applied if a set of IP addresses were involved in various malicious activities including malware repositories hosting malicious content, phishing sites, representing a significant security concern, telephone scams, service theft advice sites, and call-home addresses that were used for command and control servers (C2) by malware running on infected computers. A benign label was applied to IP addresses in the training data if a set of IP addresses were not involved in any known malicious activity but rather benign IP addresses such as hosting social network infrastructures, search engines, video hosting providers, or other benign activities. The labelling procedure resulted in 160,813 malicious IP addresses and 294,435 benign IP addresses.

To obtain information on IP addresses associated with email campaigns, data was obtained from externally available Spamhaus and DNSWL email reputation datasets. DNSWL is a static reputation list containing IP addresses provided by organizations who have had prompt reactions to abuse taking place in their networks, especially their mailservers. Malicious data was obtained from the widely used block-lists from SpamHaus—SpamHaus Exploits Block List (XBL) and SpamHaus Block List (SBL). XBL is a real-time database of IP addresses of hijacked personal computers infected by illegal third-party exploits, including open proxies, and worms/viruses with built-in spam engines. SBL is a dataset from which SpamHaus does not recommend the acceptance of electronic mail. The data obtained from external databases was down sampled to match the magnitude of the collected web-based dataset, resulting in 432,792 labeled IP addresses, with 215,909 malicious and 216,883 benign IP addresses. IP addresses that could not be labeled due to missing information or colliding label information were removed from both datasets.

Using the training data, Hilbert curves were generated to visualize the dataset over the IPv4 space, as shown in FIGS. 5A and 5B. The blue points represent benign IP addresses and red points represent malicious IP addresses, as described previously. FIG. 5A shows the distribution of the dataset composed of phishing, malware repositories, and C2 addresses while FIG. 5B depicts the distribution of the spam database, over the IPv4 space. Clustered blocks were observed on the curves that are overwhelmingly malicious, as indicated by the red clusters. A comparison between the distributions indicated that there was little to no overlap between the two datasets.

The Hilbert curves confirmed a non-uniform distribution of maliciousness associated with IP addresses. They also revealed potential blind spots in the data arising from lack of data where blocks of IP addresses had few or no labels. This motivated an approach to augment the dataset with additional information including extended characteristics associated with the IP addresses. The IP address dataset was also augmented using geographic information associated with the IP addresses when available. The MaxMind's country database was used to add geographic details to the ISPs in the data set of IP addresses including the training data and the test data.

The IP address dataset was also augmented using information associated with the domain of each IP address. Similar to the varying profiles of how ISPs handled malicious content or malicious actors (e.g., immediately shutting down or continuing to serve malicious content), some registrars or DNS services may be less strict about malicious domains. This suggested the information available that may help identify "bad" DNS services or WHOIS masking services that are disproportionally associated with malicious content. Threat actors may preferentially use some of these "bad" DNS services or WHOIS masking services. Using the domain names as the basis, the dataset was augmented with information like the name-server resolving the A and PTR records of the domain, the IP address of the name-server, and the WHOIS registrar and registrant of the domain. The connection between an IP address and a domain, domain and name-server, and name-server and an IP address may have many-to-many connections. This many-to-many connected network was randomly downsampled to generate one or more many-to-one connections.

The ML models included in an ISP representation generator and a characteristics representation generator (e.g., similar to those shown in FIG. 2) included CNN based models that used numerical vectors as inputs. For the CNN based models, strings of variable length (associated with ISP data and/or characteristics data) were extracted from IP address data where applicable. The variable length strings were converted into numerical vectors of fixed length by collecting n-grams over the textual data in the variable length strings (e.g., n-grams with n=4). A non-cryptographic hash function, MurmurHash, was used over the n-grams to generate fixed length numerical vectors.

The tested ML models included a first model trained to use IP address information alone to identify maliciousness of the IP address, a second model trained to use IP address information, infer an ISP representation, and embed the ISP representation in the representation of the IP address and use it to identify maliciousness of the IP address, and a third model trained to use IP address information and extended characteristics associated with the IP address to identify maliciousness of the IP address.

The ML models were trained using a binary cross-entropy function to train the model with a randomly sampled 1024-sized batch from the dataset with an even number of malicious versus benign samples. The ML models were trained for 15 epochs and the performance of each ML model on the test data was evaluated by comparing the results (e.g., predictions of maliciousness associated with each IP address in the test data set) of the ML models with the known labels. The accuracy of the predictions of each ML model was quantified by computing a rate of false positives (False Positive Rate or FPR) and a rate of true positives (True Positive Rate—TPR) associated with each ML model output. The FPR and TPR values were used to plot Receiver Operating Characteristics (ROC) curves for outputs of each ML model. The performance of each ML model was computed using the Area Under the Curve (AUC) measure of ROC curves plotted for each ML model. The ML models were built and trained using the Kera's framework, using an optimizer that implements the Adam algorithm (also referred to as Adam optimization, a stochastic gradient descent method based on adaptive estimation of first-order and second-order moments.). In an implementation, parameters used to implement the Adam optimization can included a learning rate=0.001, beta_1=0.9, beta_2=0.999, and epsilon=1e-07. The transformer models used the DistilBERT learning hyper-parameters for fine-tuning. The CNN based and the transformer based ML models were trained and tested on both the Spam-based dataset and the Web-based dataset. The results from the testing were as follows.

Figure 8B:
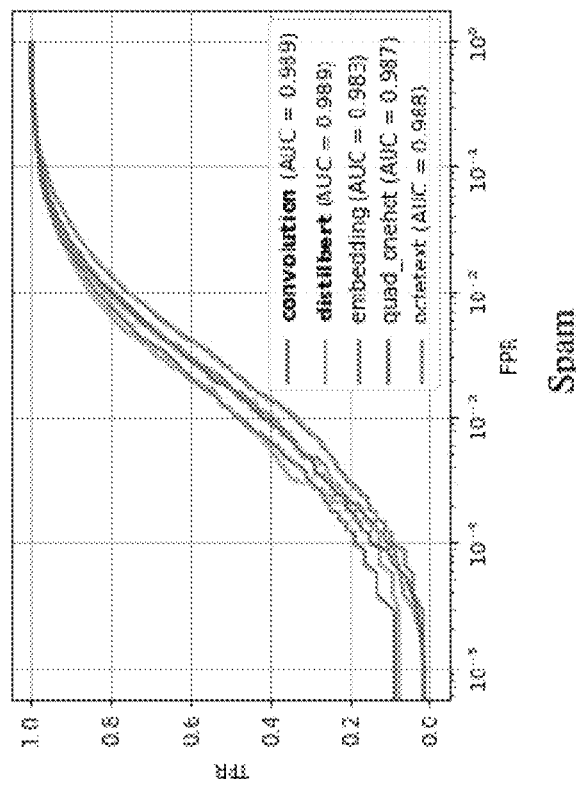
FIGS. 8A and 8B are Receiver Operating Characteristics (ROC) plots illustrating IP address reputation detection curves obtained by analyzing data from two types of datasets using various approaches implemented by an RD device, according to an embodiment.
Figure 8A:
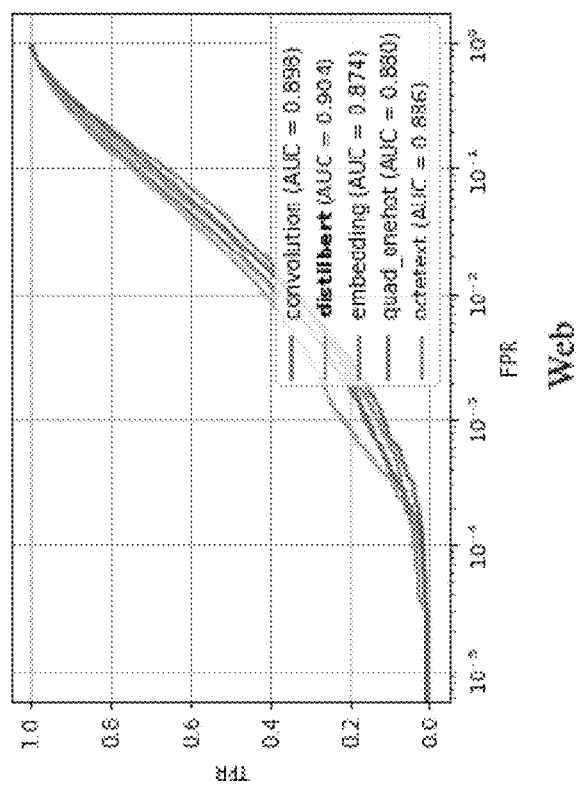

FIGS. 8A and 8B show ROC plots illustrating IP address reputation detection using data from the Spam-based dataset and the Web-based dataset. Tables in FIGS. 8C and 8D list the total AUC values of the ROC curves associated with each ML model and the AUC values of the ROC curves at varying FPR thresholds. The ROC curves in FIGS. 8A and 8B show results from using the CNN model approach (using IP address information alone) and the transformer model approach (using IP address information alone) compared to three baseline models also operated using IP address information alone.

The results of the CNN model and the transformer-based model were compared against other models including the extended octet ("octetext") approach used as one baseline and a partial implementation ("quad onehot") included as another baseline. They utilize the binary representation of the IP addresses assuming knowledge about the host and network range split. This knowledge was not used in the experiments, only the onehot encoding of the quads of the IP address was implemented. Some experiments included a naive embedding approach where the decimal value of the IP address was fed to an embedding layer. This naïve embedding approach ("embedding") was used as an additional baseline for comparison.

As shown in the results in FIGS. 8A and 8B and the AUC values in the tables in FIGS. 8C and 8D, the CNN model ("convolution") as well as the transformer based model ("distilbert") outperform the baseline models ("embedding", "quad-onehot", "octetext") used for comparison on both datasets, as indicated by larger AUC values. The majority of the false positive results were found to arise from a single subnet with overwhelmingly malicious content. The results from the web-based dataset is shown in FIG. 8A and the results from the Spam-based dataset is shown in FIG. 8B. Both the CNN models and the transformer models were found to provide a valuable addition to more complex protection systems.

The IP space assigned to certain ISP organizations might not be contiguous in the IP address dataset and may not cover the whole IP space. Observing a disproportionately malicious ISP organization in one segment of the IP space may allow generalization of the knowledge to a different segment owned by the same ISP where a detailed IP address data may be lacking.

Figures 9A, 9B:
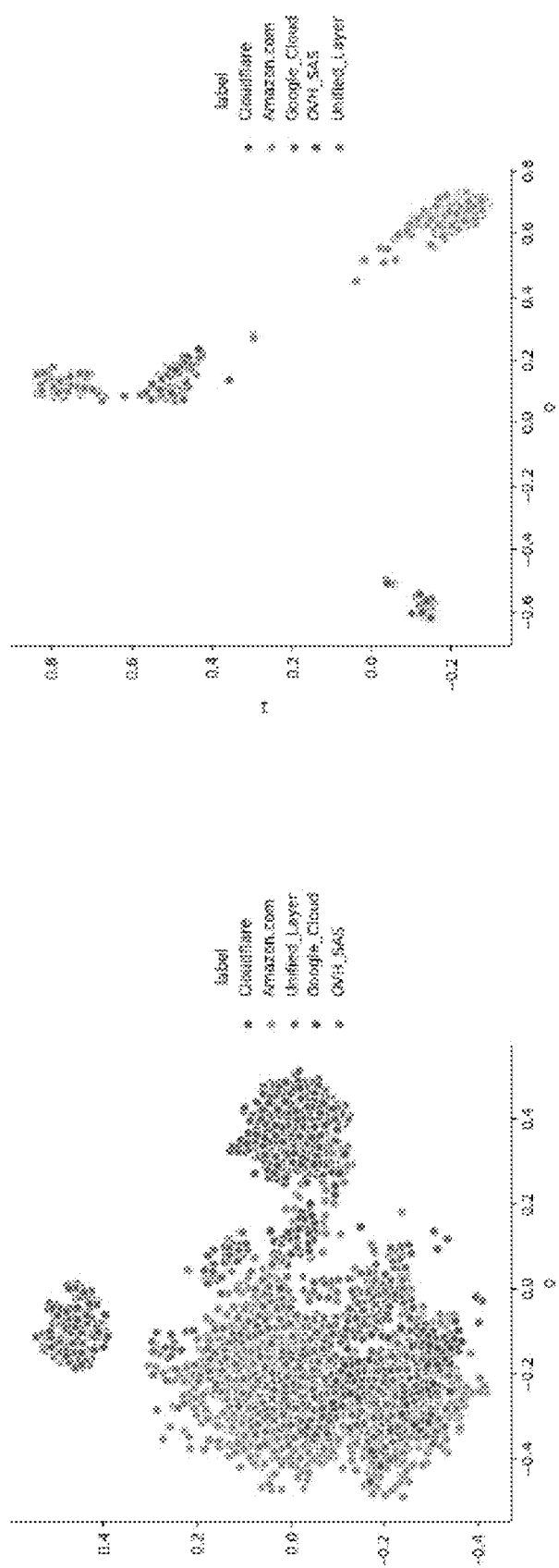
FIGS. 9A and 9B are plots showing representations of IP addresses in an abstract representational space with and without using information based on an inferred ISP representation, respectively, generated using an ML model in an RD device, according to an embodiment.

FIGS. 9A and 9B illustrate the nature of the distribution of ISPs associated with IP addresses and the available rich ISP information that can be learned by an ML model and taken advantage of for IP address reputation detection. FIGS. 9A and 9B show the representations of IP addresses generated by an ML model (e.g., an ISP representation generator 106 described above) plotted in an abstract representational space (defined by the first two principle components) without being trained to utilize and embed ISP information and after being trained to utilize and embed ISP information.

As an example, an ML model was trained using a loss function called CosFace with the objective of labeling IP addresses with their respective ISPs. The goal was to map the IP representations to a common region, in an abstract representational embedding space, based on the associated ISP. This approach was used to compress the ISP information that may be obtained from an ISP lookup table on the available IP address data into an inference by an ML model, which can then be incorporated into the representational model and then be used to provide input to a classifier model.

To learn an embedding space based on an ISP of an IP address, the various models were pre-trained using the triplet loss, CosFace, and softmax functions as described previously. The CNN model configured for IP address information alone was converted to extend the input portion that corresponded to ISP information to incorporate the pre-trained model up to the last dense layer and taking the new IP embedding as an input.

Figure 10:
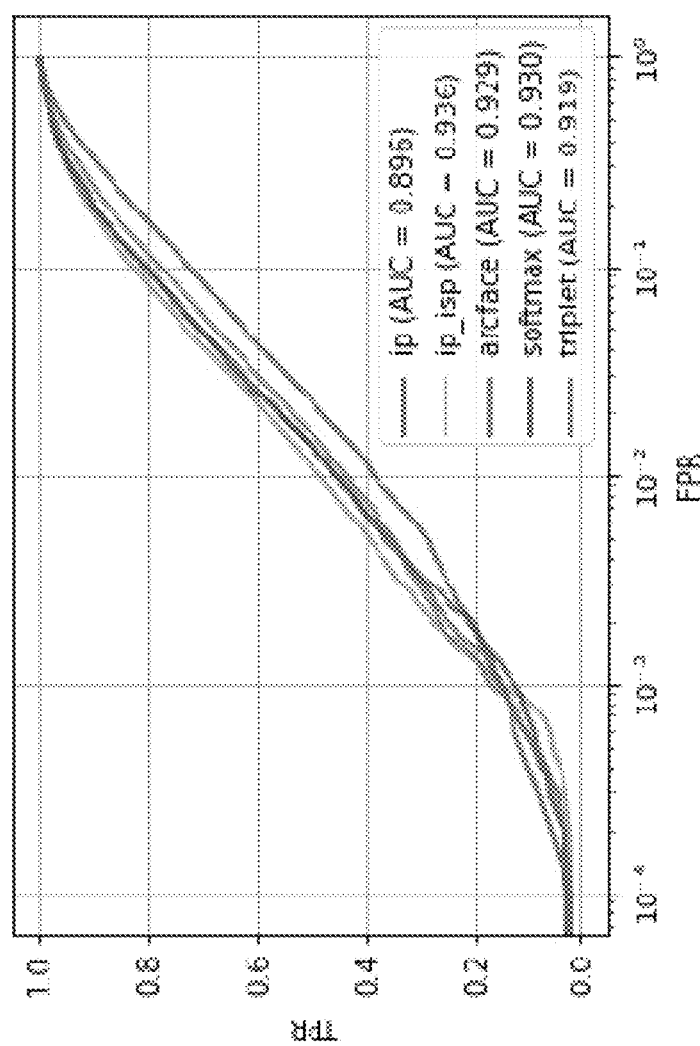
FIG. 10 is an ROC plot illustrating IP address reputation detection curves obtained by analyzing data from an example dataset using various approaches implemented by an RD device, according to an embodiment.

The results of incorporating the representation learning of ISP information on the web-based dataset are shown in FIG. 10. While the IP-to-ISP embedding approach results in a slightly lesser level of accuracy (AUC of 0.929) than when both IP address and ISP data are available and used directly (AUC of 0.936), the ISP data may not be available under some circumstances, as discussed previously. Under such circumstances, there is a significant improvement over the case when only the IP address is available. Using solely the IP address as a regular input with the ISP learned representation using CosFace and softmax performed an AUC of 0.929 ("arcface"). Comparatively, the n-gram encoding performed an AUC of 0.936 ("ip-isp"), and the IP-only approach performed an AUC 0.896 ("ip"). Learning embeddings using a triplet loss did not perform as well as the softmax or CosFace approaches.

The CNN model and the transformer model were modified to incorporate information from extended characteristics associated with the IP addresses. The extended characteristics included identifiers of the ISP associated with each IP address, a country associated with the IP address, a name-server associated with the IP address, a registrar associated with the IP address, a registrant associated with the IP address, and/or a pointer (PTR) record associated with the IP address.

As additional features or extended characteristics are not always present due to engineering complexities or non-availability of data, the ML model used incorporated the ability to handle missing data. For the spam-based dataset the domain information was not available, therefore only features based on IP address were used as inputs. Unlike the spam-based dataset, however, the web-based dataset did include both IP address information and domain information.

The ML models were efficiently extended to be flexible enough to handle additional features or extended characteristics that could be presented as inputs to improve performance. Data involving missing values or missing characteristics were simulated using a subset of the data in which every characteristic was present, and a selection of the extended characteristics were randomly masked out. For the CNN model the missing values associated with the extended characteristics were replaced with a predefined value (e.g., an extreme value that is not present in the dataset). For the transformer model, the missing values associated with the extended characteristics were replaced with the word "Unknown".

Figure 11A:
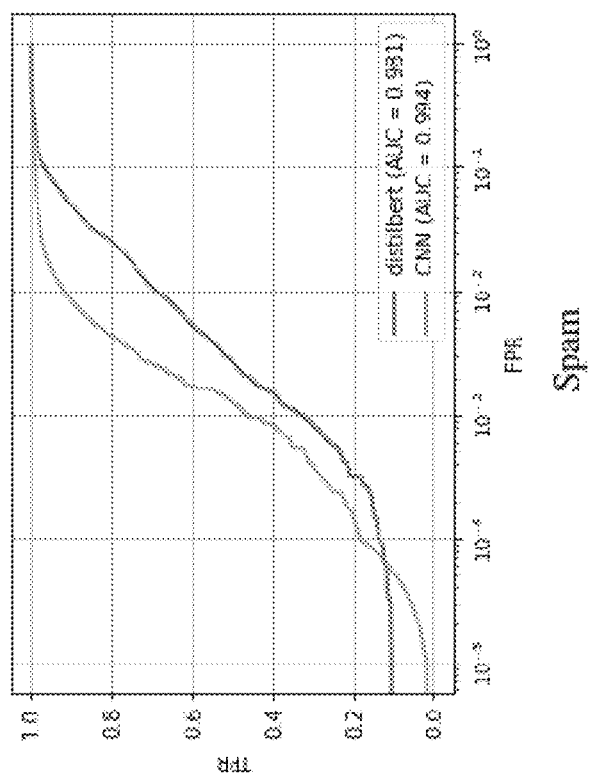
FIGS. 11A and 11B are ROC plots illustrating IP address reputation detection curves obtained by analyzing data from example datasets using various approaches, as implemented by an RD device according to an embodiment.
Figure 11B:
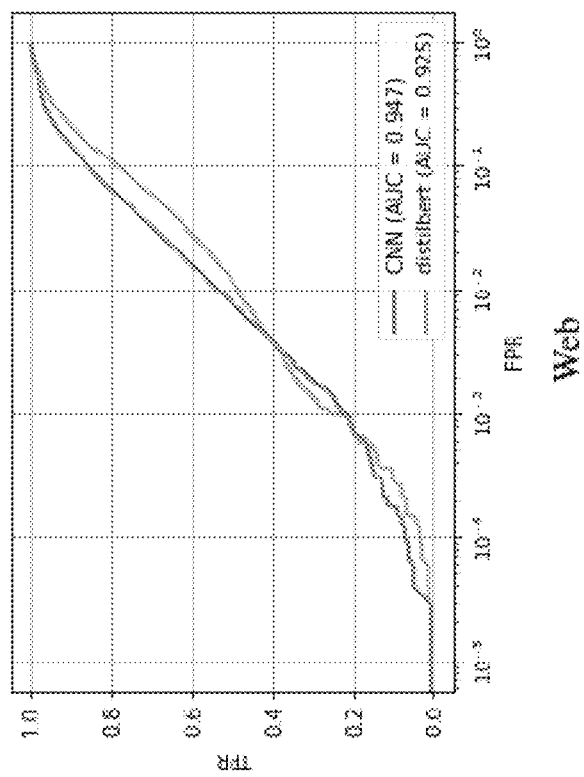

FIGS. 11A and 11B show the ROC plots derived from the results of IP reputation detection using ML models incorporating extended characteristics, in the web-based dataset and the spam-based dataset, respectively. The tables in FIGS. 11C and 11D list the total AUC values and the AUC values at specified false positive rates, for the results from the web-based data set and the spam-based data set, respectively. As shown, the CNN model performed better than the transformer model.

The table in FIG. 11E shows results from using the CNN based ML model configured to incorporate and use extended characteristics for IP address reputation detection. The columns in the table in FIG. 11E list AUC values obtained from ROC curves that resulted from testing on data sets with varying percentage of missing values. The AUC values being comparable without rapid degradation in accuracy with increase in the fraction of missing values indicated that the CNN model could be configured to successfully learn not to include a missing value (substituted with a predefined value (e.g., an extreme value)) in the process of decision making. The model interpolated between the IP-only features and extended characteristics including the extreme values without any substantial performance degradation.

To aid with visual interpretability, a random set of 10 million routable IP addresses were generated and visualized as un-thresholded (raw probabilities) predictions of the CNN-based model as a heatmap on a Hilbert curve. To generate these predictions, the IP and the ISP were used as the only input. FIG. 12A shows the visualization of the heatmap indicating IP address reputation resulting from the predictions of the CNN based model. FIG. 12B shows a magnified portion of the visualization including a cluster of IP addresses predicted to be malicious and having a bad reputation as indicated by the red coloring. FIG. 12C shows a list of IP addresses and the associated domain names of the IP addresses that are mapped on the visualization of the IP space shown in FIG. 12B in the red colored region identifying the cluster of addresses predicted to be malicious and having a bad reputation. The predicted results in FIG. 12A can be compared to the raw data in the visualization shown in FIGS. 5A and 5B. The comparison showed that the model successfully identified the malicious clusters of IP addresses.

While various embodiments have been described above, it should be understood that they have been presented by way of example only, and not limitation. Where methods and/or schematics described above indicate certain events and/or flow patterns occurring in certain order, the ordering of certain events and/or flow patterns can be modified. While the embodiments have been particularly shown and described, it will be understood that various changes in form and details can be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory; and
a processor operatively coupled to the memory, the processor configured to:
identify an internet protocol (IP) address associated with potentially malicious content, define each row from a set of rows of a matrix by applying a different subnet mask from a plurality of subnet masks to a binary representation of the IP address to define that row of the matrix, apply a convolutional window across the set of rows of the matrix to identify a relative contribution of each row from the set of rows to define a representation of the matrix, provide the representation of the matrix as an input to a machine learning model (ML model), and receive, from the ML model, a score associated with a maliciousness of the IP address, the score being based on a classification associated with the IP address.

2. The apparatus of claim 1, wherein the processor is further configured to:
identify a set of characteristics associated with the IP address;
define a feature vector based on the set of characteristics; and
provide the feature vector as an input to the ML model.

3. The apparatus of claim 1, wherein the processor is further configured to perform a remedial action against the IP address based on the score meeting a predefined criterion.

4. The apparatus of claim 1, wherein the ML model is a first ML model and the processor is further configured to:
infer a representation of an internet service provider (ISP) associated with the IP address by providing the IP address as an input to a second machine learning model; and
provide the representation of the ISP as an input to the first ML model.

5. The apparatus of claim 1, wherein the processor is further configured to:
identify a first subset of characteristics from a plurality of characteristics associated with the IP address, a second subset of characteristics from the plurality of characteristics being unidentified;
define a feature vector based on the first subset of characteristics and a predefined value for each characteristic from the second subset of characteristics; and
provide the feature vector as an input to the ML model.

6. A non-transitory processor-readable medium storing code representing instructions to be executed by a processor, the instructions comprising code to cause the processor to:
identify an internet protocol (IP) address associated with potentially malicious content;
define a matrix based on the IP address;
define each row from a set of rows of the matrix by applying a different subnet mask from a plurality of subnet masks to a binary representation of the IP address to define that row of the matrix;
apply a convolutional window across the set of rows of the matrix to identify a relative contribution of each row from the set of rows to define a representation of the matrix;
infer a representation of an internet service provider (ISP) associated with the IP address by providing the IP address as an input to a first machine learning model;
provide the matrix and the representation of the ISP associated with the IP address as inputs to a second machine learning model trained to generate a classification associated with the IP address based on the matrix and the representation of the ISP associated with the IP address; and receive, from the second machine learning model, a score associated with a maliciousness of the IP address, the score being based on the classification associated with the IP address.

7. The non-transitory processor-readable medium of claim 6, wherein each row of the matrix includes a representation of a different subnet of the IP address.

8. The non-transitory processor-readable medium of claim 6, further comprising code to cause the processor to:
perform a remedial action against the IP address based on the score meeting a predefined criterion.

9. The non-transitory processor-readable medium of claim 6, further comprising code to cause the processor to:
identify a set of characteristics associated with the IP address, the set of characteristics includes an identifier associated with at least one of a country associated with the IP address, a name-server associated with the IP address, a registrar associated with the IP address, a registrant associated with the IP address, or a pointer (PTR) record associated with the IP address; and
define a feature vector based on the set of characteristics, the code to cause the processor to provide the matrix and the representation of the ISP associated with the IP address including code to cause the processor to provide the feature vector as an input to the second machine learning model.

10. The non-transitory processor-readable medium of claim 6, further comprising code to cause the processor to:
identify a first subset of characteristics from a plurality of characteristics associated with the IP address, a second subset of characteristics from the plurality of characteristics being unidentified; and
define a feature vector based on the first subset of characteristics and a predefined value for each characteristic from the second subset of characteristics, the code to cause the processor to provide the matrix and the representation of the ISP associated with the IP address including code to cause the processor to provide the feature vector as an input to the second machine learning model.

11. A method, comprising:
identifying an internet protocol (IP) address associated with potentially malicious content;
defining a matrix based on the IP address, each row of the matrix including a representation of a different subnet of the IP address;
identifying a set of characteristics associated with the IP address;
defining a feature vector based on the set of characteristics;
providing the matrix and the feature vector as inputs to a convolutional neural network (CNN) trained to generate a classification associated with the IP address based on the matrix and the feature vector, wherein the CNN slides a convolutional window across the matrix to identify a relative contribution of a set of features in the matrix; and
receiving, from the CNN, a score associated with a maliciousness of the IP address, the score being based on the classification associated with the IP address.

12. The method of claim 11, wherein the defining the feature vector includes providing each characteristic from the set of characteristics as an input to a hash function to define the feature vector.

13. The method of claim 11, wherein the set of characteristics is a first subset of characteristics from a plurality of characteristics, a second subset of characteristics from the plurality of characteristics being unidentified, the defining the feature vector including providing a predefined value in the feature vector to represent each characteristic from the second subset of characteristics.

14. The method of claim 11, wherein a characteristic from the set of characteristic includes a representation associated with an internet service provider (ISP) associated with the IP address, the identifying the set of characteristics including inferring the representation associated with the ISP by providing the IP address to a machine learning model.

15. The method of claim 11, wherein the defining the matrix includes defining the matrix based on a binary representation of the IP address.

16. The method of claim 11, wherein the set of characteristics includes an identifier associated with at least one of an internet service provider (ISP) associated with the IP address, a country associated with the IP address, a nameserver associated with the IP address, a registrar associated with the IP address, a registrant associated with the IP address, or a pointer (PTR) record associated with the IP address.

17. The method of claim 11, further comprising:
performing a remedial action against the IP address based on the score meeting a predefined criterion.

* * * * *